United States Patent [19]
Lee et al.

[11] Patent Number: 5,629,936
[45] Date of Patent: May 13, 1997

[54] CONTROL OF CONSECUTIVE PACKET LOSS IN A PACKET BUFFER

[75] Inventors: Chaewoo W. Lee, Coralville; Mark S. Andersland, Iowa City, both of Iowa

[73] Assignee: University of Iowa Research Foundation Inc., Iowa City, Iowa

[21] Appl. No.: 283,698

[22] Filed: Aug. 1, 1994

[51] Int. Cl.$^6$ .................................................. H04L 12/56
[52] U.S. Cl. ........................................... 370/230; 370/234
[58] Field of Search ................................. 370/94.1, 94.2, 370/60, 85.6, 84, 102; 395/200, 250, 650

[56] References Cited

U.S. PATENT DOCUMENTS

| | | | |
|---|---|---|---|
| 4,769,811 | 9/1988 | Eckberg, Jr. et al. | 370/60 |
| 4,849,968 | 7/1989 | Turner | 370/60 |
| 5,233,606 | 8/1993 | Pasham et al. | 370/85.6 |
| 5,390,299 | 2/1995 | Rege et al. | 370/94.1 |
| 5,400,329 | 3/1995 | Tokura et al. | 370/94.1 |

OTHER PUBLICATIONS

Lee Goldberg, "ATM silicon: ready for takeoff", Electronic Design, pp. 51–65. (Apr. 1994).
P.E. Boyer et al., "Spacing cells protects and enhances utilization of ATM links," IEEE Network, vol. 6, pp. 38–49. (Sep. 1992).
I. Cidon, et al., "Analysis of packet loss processes in high-speed networks," IEEE Trans. Info. Theory. vol. 39, pp. 98–108. (Jan. 1993).
J.M. Ferrandiz, et al., "Monitoring the packet gap of real-time packet traffic," Queueing Systems, vol. 12, pp. 231–242. (1992).
S. Li, "Study of information loss in packet voice systems," IEEE Trans. Commun., vol. 37, pp. 1192–1202 (1989).
D.W. Petr et al., "Priority discarding of speech in integrated packet networks," IEEE J. Select. Areas Commun., vol. 7, pp. 644–656 (1989).
D.W. Petr, et al., "End to end cell discarding analysis for ATM networks," Proc. IEEE INFOCOM 93, pp. 1178–1185 (1993).
M. Sidi et al., "Congestion control through the input rate regulation," IEEE Trans. Commun., vol. 41, pp. 471–477 (Mar. 1993).
N. Yin et al., "Performance analysis of a priority-oriented packet voice system," Proc. IEEE INFOCOM 87, San Francisco, CA. pp. 856–863 (1987).
N. Yin et al., "Implication of dropping packets from the front of the queue," IEEE Trans. Commun., vol. 41, pp. 846–851 (1992).
V. Ramaswami et al., "Efficient traffic performance strategies for packet multiplexers", Computer networks and ISDN Systems 20, pp. 401–407. (1990).

*Primary Examiner*—Douglas W. Olms
*Assistant Examiner*—Min Jung
*Attorney, Agent, or Firm*—Fleshner & McConathy PLLC

[57] ABSTRACT

A circuit and method provides for optimal packet dropping to directly control consecutive packet loss (also called "average packet gap") in a packet buffer. The circuit and method can be used in a packet switched system having either a single packet class or multiple packet classes. The invention can be used at any point of the packet switched system, e.g., source buffers, switching node buffers, and destination buffers. A detailed proof shows that depending on configuration, the packet dropping policy is optimal for either minimizing or maximizing the average packet gap. More generally, the circuit and method can be used for controlling the source gaps created in any service system with a finite buffer. When a subset of customers from an ordered sequence of customers must be denied service due to to system overflow.

19 Claims, 21 Drawing Sheets

OVERFLOW ==> DROP PACKET IN POSITION $P$
($B+1$ and $B+2$ denote rear dropping)

$$\begin{Bmatrix} \text{PACKET DROP} \\ \text{DEPARTURE} \\ \text{OF ANY CLASS} \end{Bmatrix} = \begin{Bmatrix} \text{UPDATE } P^i \text{ to } P^{i'}, 1 \leq i \leq K, \text{ USING} \\ P^{i'} = \begin{cases} P^i & \begin{array}{l}\text{(DROP of CLASS } k \text{ } (i \neq k) \text{ PACKET} \\ \text{and } P^i < P^k \text{ or } P^i > B) \\ \text{DEPART and } 1 < P^i < B+1 \end{array} \\ P^i - 1 & \begin{array}{l}\text{(DROP of class } k \text{ } (i \neq k)) \\ \text{PACKET and } P^k < P^i < B+1) \end{array} \\ \begin{array}{l}\text{(The Position of the} \\ \text{First Class } i \text{ Packet} \\ \text{After Depart.)}\end{array} & \begin{array}{l}\text{(DEPART and } P^i = 1, \text{ Can find at} \\ \text{least One Class } i \text{ Packet in the buffer.)} \end{array} \\ B+1 & \begin{array}{l}\text{(DEPART and } P^i = 1, \text{ No Class } i \\ \text{Packet in the buffer.)} \end{array} \end{cases} \end{Bmatrix}$$

$$\begin{Bmatrix} \text{PACKET DROP} \\ \text{OF} \\ \text{CLASS } k \end{Bmatrix} = \begin{Bmatrix} P^{k'} = \begin{cases} \begin{array}{l}\text{(The Position of the} \\ \text{Second Class } k \\ \text{Packet} \geq P^k \\ \text{After Drop.)}\end{array} & \begin{array}{l}\text{(DROP and Can find at least Two} \\ \text{Class } k \text{ Packet} \geq P^k \\ \text{After Drop.)} \end{array} \\ B+1 & \begin{array}{l}\text{(DROP and Can Not find at} \\ \text{least Two Class } k \text{ Packet} \geq P^k \\ \text{After Drop.)} \end{array} \\ B+2 & \text{DROP and } P^k = B+1 \end{cases} \end{Bmatrix}$$

$$\begin{Bmatrix} \text{PACKET ARRIVAL} \\ \text{OF} \\ \text{CLASS } k \\ \text{AND NO DROP} \end{Bmatrix} = \begin{Bmatrix} P^{k'} = \begin{cases} B+1 & \text{NO DROP and } P^k = B+2 \\ \begin{array}{l}\text{(The position of the} \\ \text{Packet in the buffer.)}\end{array} & \text{NO DROP and } P^k = B+1 \\ P^k & else \end{cases} \end{Bmatrix}$$

$$\begin{Bmatrix} \text{NEW SESSION } k \\ \text{STARTS} \end{Bmatrix} = \begin{Bmatrix} P^{k'} = \begin{cases} B+1 & \text{DROP} \\ \begin{array}{l}\text{(The position of the} \\ \text{Packet in the buffer.)}\end{array} & \text{NO DROP} \end{cases} \end{Bmatrix}$$

Figure 6

OVERFLOW ⟹ DROP PACKET IN POSITION $P$
($B+1$ and $B+2$ denote rear dropping)

$$\begin{Bmatrix} \text{PACKET DROP} \\ \text{DEPARTURE} \\ \text{OF ANY CLASS} \end{Bmatrix} = \begin{Bmatrix} P^{i\prime} = \begin{cases} P^i & \begin{cases} (\text{DROP of CLASS } k\ (i \ne k) \text{ PACKET} \\ \text{ and } P^i < P^k \text{ or } P^i = B+2) \\ \text{DEPART and } P^i = B+1) \end{cases} \\ \\ \text{DEPART AND } 1 < P^i < B+1) \\ \\ P^i - 1 & \begin{cases} (\text{DROP of class } k\ (i \ne k))\ ) \\ (\text{PACKET and } P^k < P^i < B+1) \end{cases} \\ \\ B+2 & \text{DEPART and } P^i = 1 \text{ or } P^i = B+2 \end{cases} \end{Bmatrix}$$

UPDATE $P^i$ to $P^{i\prime}, 1 \le i \le K$, USING $$\begin{Bmatrix} \text{PACKET DROP} \\ \text{OF} \\ \text{CLASS } k \end{Bmatrix} = \begin{Bmatrix} P^{k\prime} = \begin{cases} (\text{The Position of the} & \text{DROP and } P^k < B+1 \\ \text{Second Class } k \\ \text{Packet} \ge P^k \\ \text{After Drop.}) \\ \\ B+1 & \text{DROP and } P^k > B \end{cases} \end{Bmatrix}$$

$$\begin{Bmatrix} \text{PACKET ARRIVAL} \\ \text{OF} \\ \text{CLASS } k \\ \text{AND NO DROP} \end{Bmatrix} \quad P^{k\prime} = \begin{cases} (\text{The Position of the} & \text{NO DROP and } P^k = B+1 \\ \text{ the Packet in the buffer.}) \\ P^k & \text{else} \end{cases}$$

$$\begin{Bmatrix} \text{NEW SESSION } k \\ \text{STARTS} \end{Bmatrix} = \begin{pmatrix} P^{k\prime} = \end{pmatrix} \begin{Bmatrix} B+1 \text{ DROP} \\ B+2 \text{ NO DROP} \end{Bmatrix}$$

Figure 11

CONTROL OF CONSECUTIVE PACKET LOSS IN A PACKET BUFFER

BACKGROUND OF THE INVENTION

1. Field of the Invention

This invention relates generally to a method for controlling gaps between customers, i.e., customer processes, in service systems with finite buffers and in particular to an apparatus and method for optimal packet dropping to control consecutive packet loss (average packet gap) in a packet buffer.

2. Background of the Related Art

In a packet switched network, data is presented at a transmit end of the network and divided into separate packets of information. These packets are routed through the network and reassembled into the original data at a receive end of the network.

Packet communications are particularly useful in time-shared systems since the user is only using system bandwidth when needed. This allows multiple users the opportunity to be simultaneously connected to the same network since each user only uses system bandwidth when needed. Additionally, because the packet switched system is handling packets rather than directly handling the original information, it is possible to connect a variety of different types of users (e.g. voice, video, and data) to a single network.

Of course there is a limit to the number of packets that the network can handle at one time. If users send too many packets over the system at the same time, congestion can occur. Generally, packet switching nodes throughout the network have buffers (e.g. FIFO buffers) to temporarily store packets. A typical packet switching node may have input buffers for storing incoming packets that are waiting for routing, a switch for routing packets, and output buffers for storing packets that have been routed but are waiting to be sent.

Additionally, source buffers may exist in the user equipment at the transmit end of the network or between the user equipment and the input port to the network. Destination buffers may exist in the user equipment at the receive end of the network or between the user equipment and the output port from the network. Since a great deal of user equipment is bidirectional, source and destination buffers may coexist for some user equipment.

When the packet switched system becomes congested, buffers in the system can become full and are unable to store incoming packets. When this buffer overflow condition occurs, it is necessary to drop packets already in the buffer in order to store incoming packets.

Several different policies for packet dropping in a packet buffer have been developed. One policy is to drop from the rear of the buffer (Rear Dropping, see FIG. 15(a)), i.e. to drop the incoming packets until the buffer is no longer full.

A second policy, suggested by Yin et al. in "Implication of dropping packets from the front of the queue,"*IEEE Trans. Commun.*, vol. 41, 1992, pp. 846–51, is to drop packets from the front of the buffer (Front Dropping, see FIG. 15(b)). Yin et al. shows that a policy of front dropping improves both average buffering delay and the overall loss performance for time constrained traffic.

A third set of policies, one of which is disclosed in U.S. Pat. No. 4,769,810 and 4,769,811, involves marking incoming packets with a priority marker (establishing classes of packets) and dropping low priority packets (Priority Dropping, see FIG. 15(c)). Although this policy decreases the probability of dropping high priority packets, it accomplishes this result at the expense of increasing the probability of dropping low priority packets.

The problem with all of these approaches is that they only control packet loss.

SUMMARY OF THE INVENTION

Accordingly, an object of the invention is to provide a circuit and method for optimal packet dropping to control consecutive packet loss (average packet gap) in a packet buffer. We will show through a detailed proof that the disclosed packet dropping policy is optimal for either minimizing or maximizing the average packet gap. This proof assumes that the packet arrival process is stationary and that the system has reached steady-state.

More generally, another object of the invention is to provide a method for controlling gaps between customers in any service system with a finite buffer.

Another object of the invention is to provide a circuit and method to extend our packet dropping policy to a system with multiple packet classes.

These objects are accomplished, in accordance with the invention, by using a simple state transition diagram to determine the next packet dropping location. Our packet dropping policy can either minimize or maximize the average packet gap, regardless of packet arrival, buffer size, or buffer location.

One advantage of the invention is that it is provably optimal at either minimizing or maximizing the average packet gap.

Another advantage is that the computational burden is small because the location of the next packet to be dropped can be determined prior to each overflow using a simple state transition rule and this determination requires at most a simple context memory search.

Another advantage is that the invention works with existing systems and can be used at any point of the network, e.g. source buffers, switching node buffers, and destination buffers.

Another advantage is that it can support multiple information sources (e.g. data, voice, and video).

Another advantage is that it is independent of packet arrival statistics, buffer size, or buffer location.

Another advantage is that it can be used alone or in conjunction with existing flow control or priority mechanisms.

Another advantage is that it can be applied to traffic streams containing single or multiple packet classes.

Another advantage is that it reaches steady-state much more quickly than priority dropping, i.e. within the time required for servicing one complete buffer of packets minus one additional packet.

Another advantage is that, for the case of minimizing the average packet gap, since our packet dropping policy starts the gap as close as possible to the front of the buffer, the policy also minimizes the average packet buffering delay.

The above and other objects and advantages are accomplished by a method for controlling average packet gap size in a packet buffer, comprising the steps of receiving incoming packets at the packet buffer, transmitting outgoing packets from the packet buffer, and dropping packets from the packet buffer according to a state transition rule, when the buffer reaches overflow, to control average packet gap size.

The above and other objects and advantages are more generally accomplished by a method for controlling gap size between customers in a finite buffer of a service system, comprising the steps of receiving incoming processes at the service system, releasing outgoing customers from the service system, and creating gaps in the finite buffer according to a state transition rule, when the finite buffer reaches overflow, to control gap size between customers.

The above and other objects and advantages are also accomplished in a packet buffer circuit, comprising a buffer storage means for receiving incoming packets and transmitting departing packets, the buffer storage means generating at least one buffer state signal to indicate an overflow condition and receiving a dropping pointer signal to indicate the location of a packet to be dropped; and a dropping pointer generator, connected to the buffer storage means, for receiving the at least one buffer state signal and for generating, in response to the at least one buffer state signal, a dropping pointer signal, according to a state transition rule, to control consecutive packet loss.

The above and other objects and advantages are additionally accomplished in a packet switched system having an interconnected plurality of nodes, wherein at least one of the plurality of nodes includes a buffer circuit, and wherein the buffer circuit includes a buffer storage means for receiving incoming packets and transmitting departing packets, the buffer storage means generating at least one buffer state signal to indicate an overflow condition and receiving a dropping pointer signal to indicate the location of a packet to be dropped; and a dropping pointer generator, connected to the buffer storage means, for receiving the at least one buffer state signal and for generating, in response to the at least one buffer state signal, a dropping pointer signal, according to a state transition rule, to control consecutive packet loss.

The above and other objects and advantages will become clearer from the following detailed description of the preferred embodiments, taken in conjunction with the following drawings.

BRIEF DESCRIPTION OF THE DRAWINGS

FIG. 6 shows a state transition rule for generating the dropping pointer of the optimal packet dropping policy, according to an embodiment of the invention, to minimize the average packet gap in a multiple packet class system.

FIG. 11 shows a state transition rule for generating the dropping pointer of the optimal packet dropping policy, according to an embodiment of the invention, to maximize the average packet gap in a multiple packet class system.

DETAILED DESCRIPTION OF THE PREFERRED EMBODIMENTS

Figures 1A, 1B:
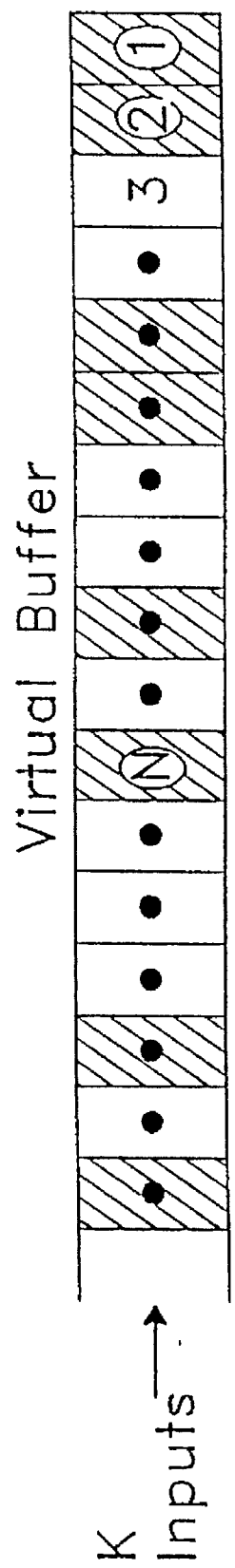
FIG. 1(a) shows a diagram of a K class G/GI/1/B or G/D/1/B queue and FIG. 1(b) shows a diagram of the corresponding virtual queuing model.

Packet loss probability alone does not provide a complete characterization of the quality of a packet switching network's packet sessions. Additional performance measures such as the average consecutive packet loss (the so called "average packet gap") must be considered. Our invention improves the average packet gap performance of packet switching systems by controlling the average packet gap present in the system's buffers. The invention includes both a method and an apparatus for implementing simple packet dropping policies that minimize or maximize the average packet gap in the buffers. All reference numerals in brackets throughout this proof refer to the list of references in Section 7, all of which are incorporated herein by reference.

1. Introduction

In packet switching systems, session performance is often characterized by the packet loss probability. For both data (e.g., file transfers), and real time traffic (e.g., voice and video), this measure is not always adequate [3, 4, 5, 8, 9]. Consider, for instance, the relative performance of sessions that lose, respectively, one in every 10 packets, and 10 consecutive packets in every 100. Both sessions exhibit the same packet loss probability, yet intuitively, the difference in average gap length must impact the quality of service.

If, for instance, the traffic uses retransmissions to correct errors (e.g., a file transfer), then the larger average gap length may be more attractive because it reduces the average number of retransmissions. If, however, the session is to carry real time traffic (e.g., a conversation) then the smaller average gap length is more attractive because it makes it easier to reconstruct the packetized signal without perceptible distortion. In fact, even very small average gap lengths in voice packet streams can produce noticeable degradations in voice quality [9].

To reduce such gap effects, some researchers have suggested admission policies based on packet priorities [5, 6, 7, 9]. These policies determine whether an arriving packet is discarded based on its priority and certain buffer occupancy thresholds. All admitted packets are then served. A mathematical analysis of consecutive packet loss in a stationary k class G/G/m/B rear-dropping queueing framework can be found in [4].

When all packets are equally important and require the same deterministic, or independent, identically distributed service, and when the packet arrival process is stationary, regardless of the packet dropping policy, the packet loss probability is determined by the buffer capacity and service rate. We can not reduce this packet loss probability for any class of packets without sacrificing packets from another class. However, we can reduce or increase the average consecutive packet loss if we allow packets within the buffer to be discarded, rather than just discarding arriving packets at the front or the rear of the buffer when the buffer fills.

For our analysis we model consecutive packet loss in the departure streams of packet switching systems with arbitrary packet dropping mechanisms. We only consider contention packet loss, i.e., we exclude packet loss due to transmission errors. Our invention provides a circuit and a method for controlling the average packet gap in the buffers of packet switching systems, and more generally, the average gap between customers in general service systems. Depending on how it is configured it will minimize, or maximize, the average packet gap in the buffer's departure stream.

For clarity, our detailed description will mainly focus on how our invention minimizes the average gap length in the buffer departure streams of systems carrying a single class of packets with deterministic service requirements. The same basic arguments, circuit, and method are equally applicable to maximizing the average gap length in buffer departure streams, and to minimizing and maximizing the average gap length in multi-class systems, and systems with more general service requirements. We will elaborate on these alternative configurations of our invention in Section 6 of our detailed description.

2. Queueing Models

Suppose that K independent sessions route packets with arbitrary arrival statistics, and identical deterministic service requirements, through a network buffer. Because the buffer is of finite length B, for some arriving packets it overflows. Depending on the packet dropping policy, either the arriving packet, or a packet of the same class in the buffer, is dropped. To study the relationship between packet dropping and packet gaps we view this K class G/D/1/B queue (FIG. 1 (a)) as having an infinite slot "virtual" buffer (FIG. 1 (b)) that operates as follows.

1. All arriving packets are admitted to the virtual buffer.
2. Packets that would have been admitted to the real buffer and later dropped, are marked R (real) [the unshaded rectangles], re-marked I (imaginary) [the shaded rectangles] at the time that they would have been dropped, and then removed from the virtual buffer when the next R-packet of the same class is served.
3. Packets that would have been admitted to the real buffer, and later served, are marked R and then leave the virtual buffer at the time that they would have been served.
4. Packets that would not have been admitted to the real buffer are marked I and remain in the virtual buffer until the next R-packet of the same class is served.

Note that we view the server as being external to the buffer.

By construction, the arrivals to, and the R-packet departures from, this virtual buffer are indistinguishable from the arrivals to, and the departures from, the real buffer. Note, however, that the gaps between packets in the real buffer are visible in the virtual buffer. In particular, each group of time-consecutive class k I-packets between a pair of time-consecutive class k R-packets corresponds to a class k packet gap.

The state of the virtual buffer at time t is denoted by $x_t:=(x_t(1),\ldots,x_t(n_t),0,\ldots)\in S$, where $x_t(i):=(c_t(i),s_t(i))$ indicates the class $c_t(i)\in\{0,1,\ldots,K\}$, and marking $s_t(i)\in\{I,R,0\}$, of the packet in the i-th virtual buffer position, and $$S:=\{x_t\in(\{0,\ldots,K\}\times\{I,R,0\})^{IN}: s_t(i)\neq 0\,i\leq n_t, s_t(i)=0,i>n_t,q_t\leq B\}. \quad (1)$$

Here $n_t=\max\{j\in IN : s_t(j)\neq 0\}$, and $$q_t = \sum_{i=1}^{n_t} 1\{s_t(i)=R\},$$

denote respectively, the virtual queue length (1=front, $n_t$=rear ), and the number of R-packets in the virtual buffer at time $t^-$ (i.e., the true buffer queue length). A class k arrival at time t changes $x_t$ as follows:

$$(x_{t-}(1),\ldots,(k,R)_m,\ldots,x_{t-}(n_{t-}),0,\ldots) \rightarrow \quad (2)$$

$$\begin{cases} (x_{t-}(1),\ldots,(k,R)_m,\ldots,x_{t-}(n_{t-}),(k,R),0,\ldots) & q_{t-}<B \\ \begin{cases} (x_{t-}(1),\ldots,(k,R)_m,\ldots,x_{t-}(n_{t-}),(k,I),0,\ldots) \\ \text{or} \\ (x_{t-}(1),\ldots,(k,I)_m,\ldots,x_{t-}(n_{t-}),(k,R),0,\ldots) \end{cases} & q_{t-}=B \end{cases}$$

The "or" reflects the basic dropping options, i.e., when a class k overflow occurs, the policy will either drop the arriving packet (i.e., mark it I), or drop the buffered class k R-packet in some position m (i.e., change R to I).

It is more complicated to describe the effect of a class k departure at time t. Let $$l_t(j,k) = \sum_{i=1}^{j-1} 1\{x_t(i)=(k,I)\} \quad (3)$$

denote the number of class k I-packets in positions 1 through j−1 at time t. Then the departure of a class k R-packet from position m at time t changes the state of the virtual buffer as follows:

$$(x_{t-}(1),\ldots,x_{t-}(n_{t-}),0,\ldots)\rightarrow(x_t(1),\ldots,x_t(n_t-1_{t-}(m,k)-1), 0,\ldots) \quad (4)$$

where $$x_{t-}(i) \rightarrow \begin{cases} x_t(i-l_{t-}(m,k)-1), & \forall i>m \\ (c_t(i-l_{t-}(i,j)),I), & \forall j\neq k, i<m \end{cases} \quad (5)$$

In words, all packets queued behind the departing R-packet move forward the number of positions vacated by the departing R and I-packets. Similarly, each packet that is not of class k queued in front of the departing R-packet moves forward by the number of positions vacated by the class k I-packets that precede it.

Our objective is to minimize or maximize the average packet gap in the departure stream. The class of admissible dropping policies Γ consists of all functions γ: S→{1,2,..., B+1} mapping an arriving overflow packet's class, and the virtual buffer's state, to a pointer to the packet to be dropped—either the arriving packet, or a buffered packet of the same class. Packets are only dropped when a buffer overflows and once a dropping decision is made, it is final.

Figures 2A, 2B:
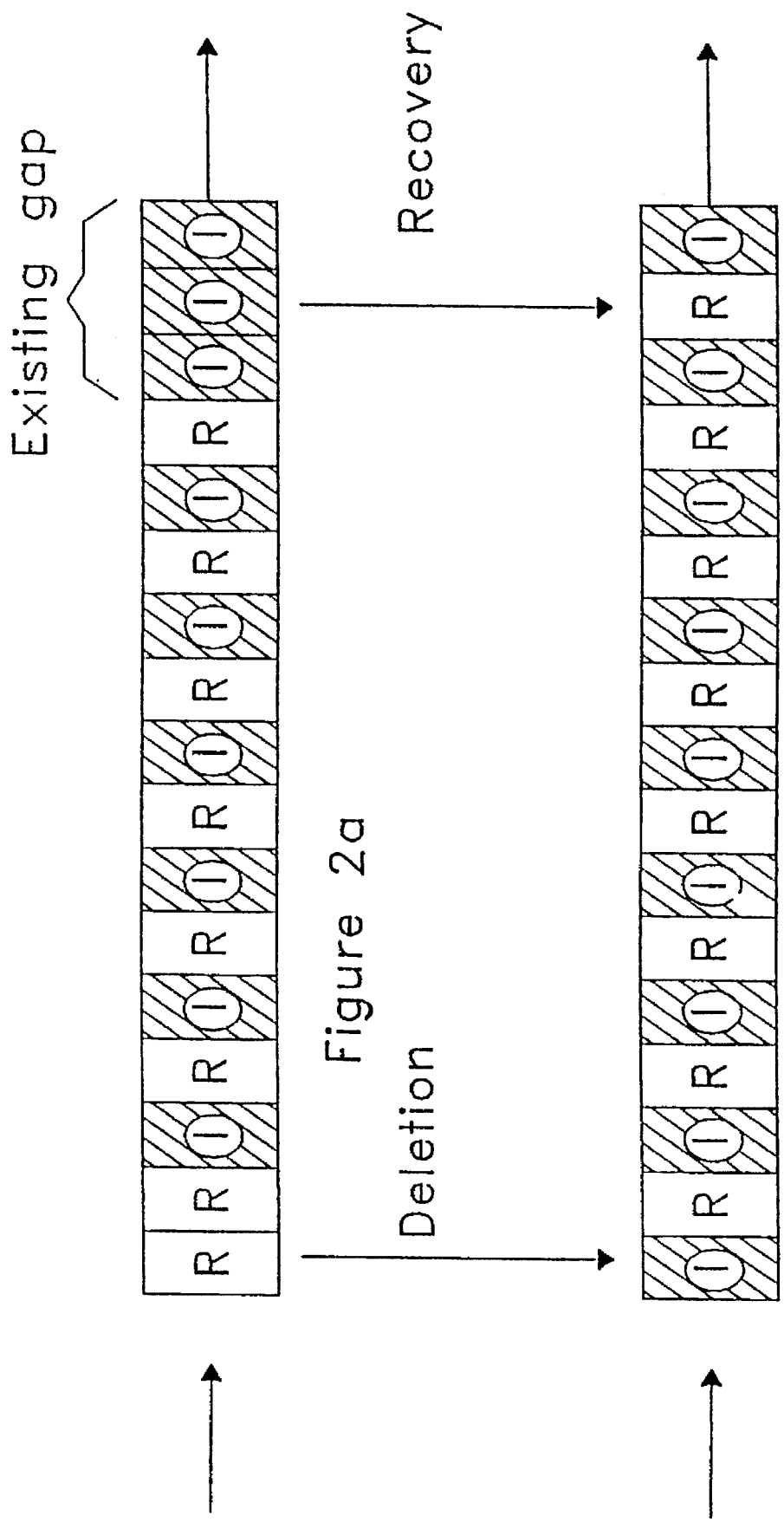
FIGS. 2(a) and 2(b) show diagrams of buffers that illustrate that deletion of a packet is allowed but recovery of a previously deleted packet is not allowed.

The system can not readmit or recover dropped packets. Thus, it is not possible to reduce the number of existing gaps (FIG. 2 (a)) by recovering previously dropped packets (FIG. 2 (b)).

Henceforth we assume that our virtual queueing model is operating in a stationary regime. This assumption allows us to use a Palm probability framework to develop our results. The terminology and notation we adopt are those of [1].

3. Performance Measures

For $1 \leq k \leq K$, let $a^k = (a_n^k)_{n \in \mathbb{Z}}$, $o^k = (o_n^k)_{n \in \mathbb{Z}}$, $d^k = (d_n^k)_{n \in \mathbb{Z}}$, and $v^k = (v_n^k)_{n \in \mathbb{Z}}$ denote the times at which, respectively, class k packets arrive at the virtual buffer, class k arrivals trigger overflows, class k R-packets depart from the virtual buffer, and class k I-packets depart from the virtual buffer. When $a^k$, $o^k$, $d^k$, and $v^k$ are indexed such that $a_n^k$, $o_n^k$, $d_n^k$, $v_n^k > 0$ for $n > 0$, and $a_n^k$, $o_n^k$, $d_n^k$, $v_n^k \leq 0$ for $n \leq 0$, then $a^k$, $o^k$, $d^k$, and $v^k$ can be viewed as simple point processes on some measurable space $(\Omega, F)$. Because all packets require the same service, $o^k$ does not depend on the dropping policy $\gamma$. However, $d^k$ and $v^k$ are $\gamma$-dependent because the order in which packet classes are served is $\gamma$-dependent.

We are interested in minimizing the average packet gap in the departure stream by maximizing the gap creation rate in the virtual buffer. To this end we define the queueing processes $G_t^k$, $Z_t^k$ and $L_t^k$ as, respectively, $$G_t^k := \sum_{i=1}^{q_t^k+1} 1\left\{ \left( \sum_{j=r_t^k(i)+1}^{r_t^k(i+1)} 1\{x_t(j) = (k,I)\} \right) \geq 1 \right\} \quad (6)$$

$$Z_t^k := G_t^k - G_{t-}^k \quad (7)$$

$$L_t^k = \sum_{i \in IN} 1\{x_{t-}(i) = (k,I), 1 \leq i < \min\{j \in IN: x_{t-}(j) = (k,R)\}\} \quad (8)$$

where $r_t^k(i)$, the buffer position of the i-th class k R-packet, is given by $$r_t^k(0) := 0 \quad (9)$$

$$r_t^k(i+1) = \min_j \{r_t^k(i) < j \leq n_t: x_t(j) = (k,R)\}$$

$$r_t^k(q_t^k + 1) := n_t$$

and $q_t^k$, the number of class k R-packets in the buffer, is given by $$q_t^k := \sum_{i=1}^{n_t} 1\{x_t(i) = (k,R)\}. \quad (10)$$

$G_t^k$ denotes the number of class k packet gaps in the virtual buffer. $Z_t^k$ indexes the change (−1, 0, or 1) in the number of class k packet gaps $G_t^k$ at time t. $L_t^k$ is the number of class k I-packets that would depart if t is a class k I-packet departure time.

The most natural time to measure $G_t^k$ and $Z_t^k$ is at the overflow times $o^k$ since packet dropping and gap creation only occur at overflow times. Similarly, the most natural time to measure $L_t^k$ is at the class k I-packet departure times $v^k$. Let $\lambda_{o^k} = E[o_{(0,1]}^k]$ and $\lambda_{v^k} = E[v_{(0,1]}^k]$ denote, respectively, the rate of class k overflow in the arrival stream and the rate of occurrence of class k packet gaps in the departure stream. From Palm probability theory we know that given a stationary process F(t), $t \in \mathbb{R}$, and a simple point process $N = (T_n)_{n \in \mathbb{Z}}$ with finite intensity, i.e, $\lambda_N = E[N_{(0,1]}] < \infty$, the expectation of F(t) at points in N is given by the Palm expectation $$E_N^0[F(0)] = \frac{1}{\lambda_N} E\left[ \sum_{n \in \mathbb{Z}} F(T_n) 1\{0 < T_n \leq 1\} \right]. \quad (11)$$

Accordingly we can define the average class k gap creation rate, and the average class k packet gap in the departure stream at class k gap departure times as, respectively, $\lambda_{Z^k} = \lambda_{o^k} E_{o^k}^0[Z_o^k]$ and $E_{v^k}^0[L_o^k]$.

In the stationary regime, the class k gap creation rate in the virtual buffer and the average class k packet gap in the departure stream are inversely proportional. Hence we have the following Theorem.

Theorem 1 Packet dropping policies that maximize the gap creation rate in the virtual buffer minimize the average class k packet gap in the departure stream.

Proof:

Let $D_t^k = \sum_{i=1}^{n_t} 1\{x_t(i) = (k,I)\}$ denote the number of class k I-packets in the virtual buffer and observe that for all dropping policies $\gamma \in \Gamma$ $$G_1^k - G_0^k = \sum_{n \in IN} Z_{o_n^k}^k 1\{0 < o_n^k \leq 1\} - \sum_{n \in IN} 1\{0 < v_n^k \leq 1\} \quad (12)$$

and $$D_1^k - D_0^k = \sum_{n \in IN} 1\{0 < o_n^k \leq 1\} - \sum_{n \in IN} L_{d_n^k}^k 1\{0 < v_n^k \leq 1\}. \quad (13)$$

Taking the expectation of (12) and (13) and noting that $E[G_1^k - G_0^k]$ and $E[D_1^k - D_0^k]$ are both zero in the buffer's stationary regime we find that $$\lambda_{Z^k} := E\left[ \sum_{n \in IN} Z_{o_n^k}^k 1\{0 < o_n^k \leq 1\} \right] = \quad (14)$$

$$E\left[ \sum_{n \in IN} 1\{0 < v_n^k \leq 1\} \right] =: \lambda_{v^k}$$

and $$\lambda_{o^k} := E\left[ \sum_{n \in IN} 1\{0 < o_n^k \leq 1\} \right] = \quad (15)$$

$$E\left[ \sum_{n \in IN} L_{o_n^k}^k 1\{0 < v_n^k \leq 1\} \right] = \lambda_{v^k} E_{v^k}^0[L_o^k]$$

Hence $\lambda_{o^k} = \lambda_{Z^k} E_{v^k}^0[L_o^k]$. The result follows because $\lambda_{o^k}$ is independent of the dropping policy due to fact that all packets require the same deterministic service. To see this, let $\sigma$ denote the packets' deterministic service requirement, and note that the buffer's workload process $$W_{a_n} = \begin{cases} W_{a_n^-} - \sigma + \sigma & W_{a_n^-} > B\sigma \\ W_{a_n^-} + \sigma & W_{a_n^-} \leq B\sigma \end{cases} \quad (16)$$

is independent of the dropping policy. Since overflows only occur when $W_{a_n^-} > B\sigma$, the overflow times must also be policy independent.

We note in passing that the same result can be shown to hold for: (i) K-class G/GI/1/B queues (as long as the K service distributions are identical), and (ii) nonstationary input processes.

4. Optimal Packet Dropping Policy

In this section we prove that the single-packet-class packet dropping policy described below maximizes the gap creation rate, and minimizes the average packet buffering delay when this delay can be reduced without increasing the average packet gap, or packet loss probability. Theorem 1 ensures that this policy also minimizes the average packet gap in the departure stream. We restrict our attention to single packet class gap minimization to simplify our notation and clarify our ideas. The modifications required to maximize the average packet gap, and or accommodate multiple packet classes, are straightforward, and are described in Section 6.

Figure 3:
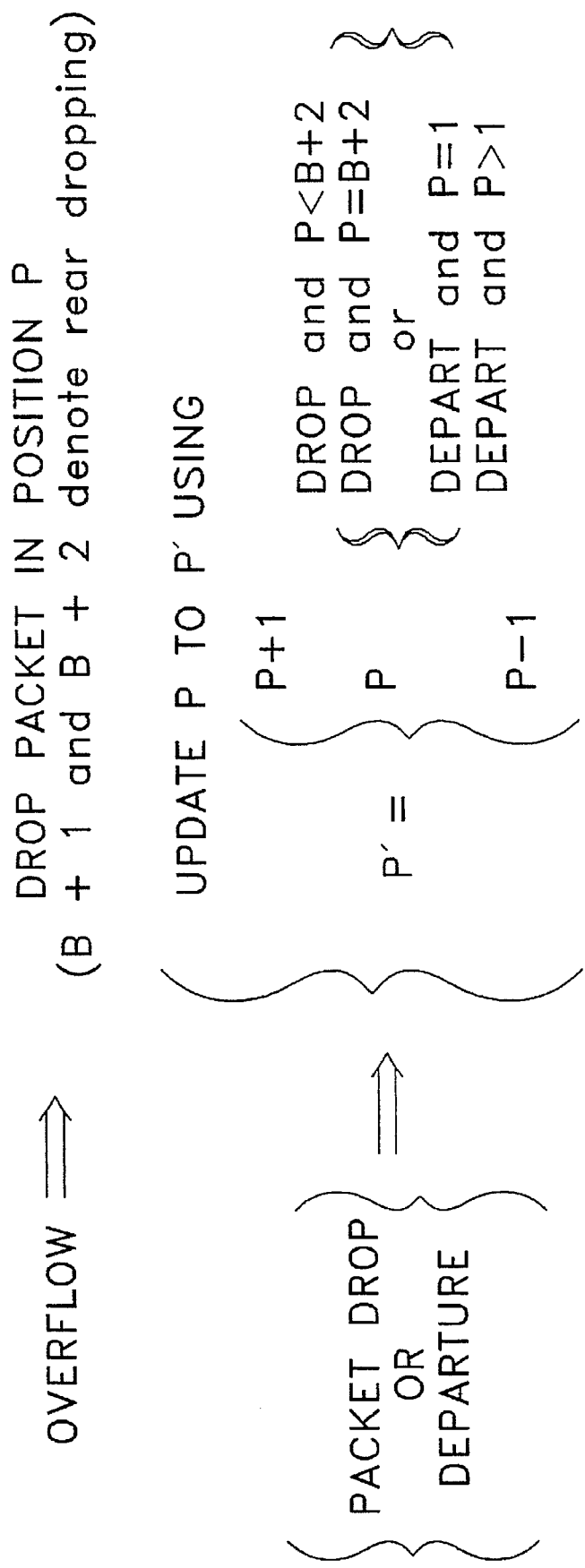
FIG. 3 shows a state transition rule for generating the dropping pointer of the optimal packet dropping policy, according to an embodiment of the invention, to minimize the average packet gap in a single packet class system.
Figure 4:
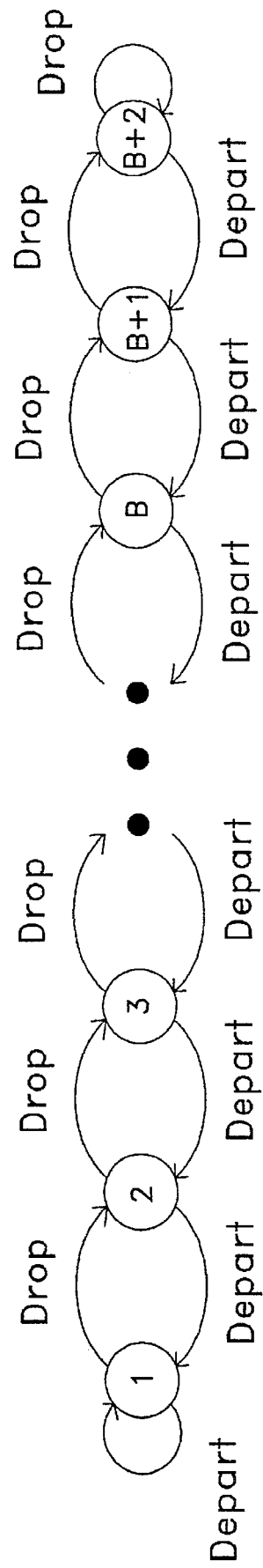
FIG. 4 shows a state transition diagram corresponding to the state transition rule in FIG. 3.
Figure 5:
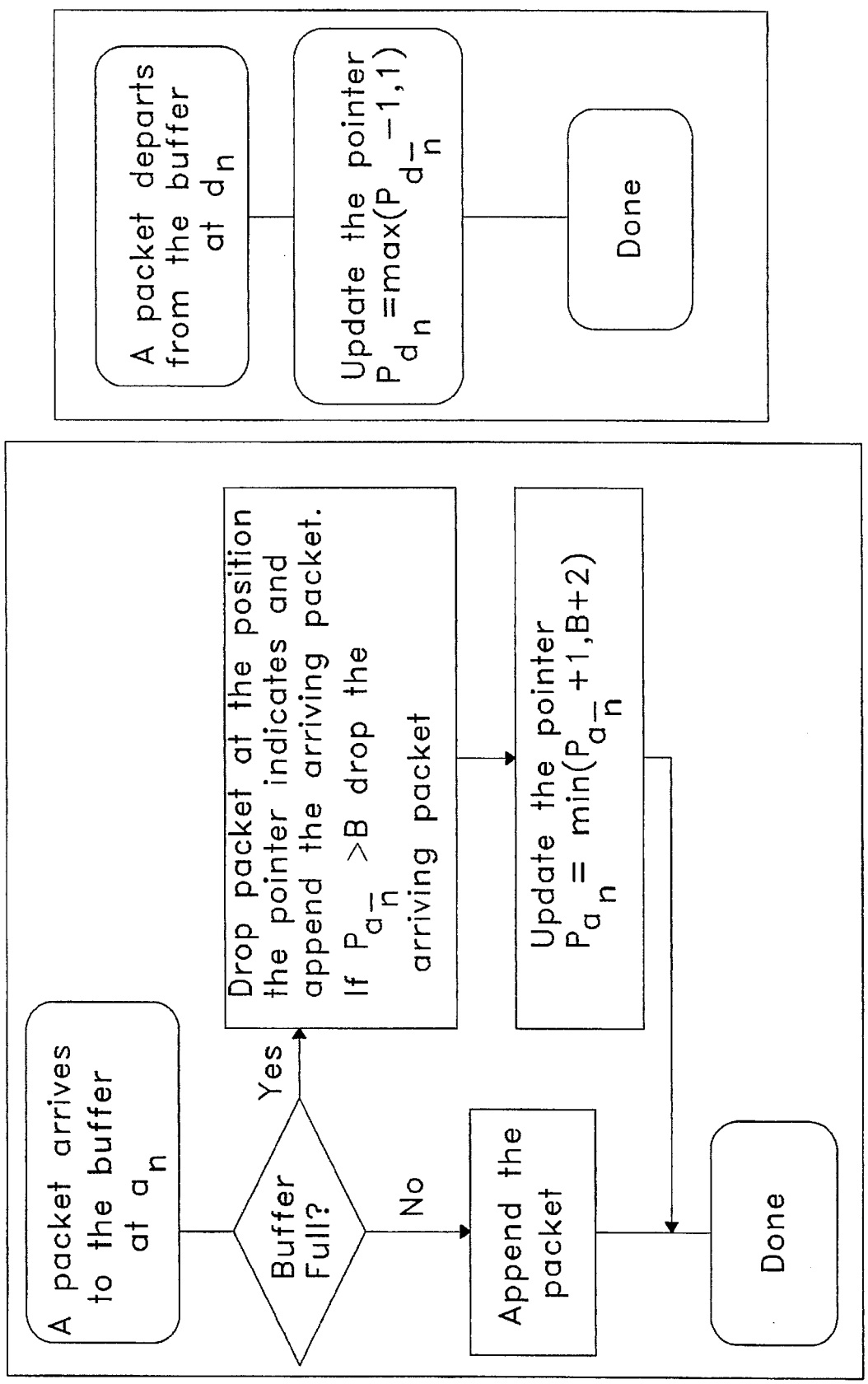
FIG. 5 shows a flow diagram corresponding to the state transition rule of FIG. 3 and the state transition diagram of FIG. 4.

Our policy operates as follows. At the time of an overflow the packet in buffer position P is dropped. After a packet is dropped or departs, the buffer position pointer is updated. The state transition rule for the update is shown in FIG. 3. The pointer-state transition diagram is shown in FIG. 4. In steady-state the pointer-state indicates the buffer position of the next packet to be dropped should an overflow occur (Positions B+1 and B+2 correspond to rear dropping). It also indicates the number of gaps in the virtual buffer plus one, e.g., when the state is 3 there are two gaps in the virtual buffer. The maximum possible number of gaps is (B+2)−1=B+1, where, as before, the buffer size is B. The pointer-state changes whenever a packet is dropped or departs, e.g., when the pointer-state is 1, and an arriving packet causes an overflow, the packet at the front of the real buffer is dropped and the pointer state changes to 2. Similarly, when the pointer state is 2 and a packet departs, the state changes to 1. Henceforth we will let $\gamma^*$ denote this single class gap minimization policy. The policy is summarized, in flow diagram form, in FIG. 5.

By Theorem 1, $\gamma^*$ is optimal if it maximizes the rate at which gaps are created in the virtual buffer. Our proof that $\gamma^*$ maximizes this rate has three steps. First we show that when the dropping policy is $\gamma^*$, the state $x_t$ is confined to a set of states $K \subset S$ in which the first of any gaps is at the front of the virtual buffer and all subsequent gaps are immediately preceded by a (gap,R)-packet pair (Lemma 1). Next we show that, given x belongs to X, pursuing dropping policies that differ from $\gamma^*$ can not increase, and may decrease the subsequent gap creation rate (Lemma 2). We conclude by proving that this ensures that, for all stationary arrival processes, $\gamma^*$'s gap creation rate is as large, or larger, than that of any other policy in $\Gamma$ irrespective of whether the policy's state process ever visits X.

Let M(x) denote the real buffer position, in state $x \in S$, of the last R-packet in the virtual buffer that is preceded by a gap, i.e., let $M(x)=\max\{i \in \{1, \ldots, B+1\}: (x(r(i)-1), x(r(i)))=(I,R)\}$, where r denotes the single class suppressed time version of $r_t^k$. Let X denote the set of $x \in S$ such that each of the first $\min\{G,q\}$ R-packets in the buffer is immediately preceded by a gap, i.e., let $X := \{x \in S: M(x) = \min\{G,q\}\}$ where G and q denote the single class suppressed time versions of $G_t^k$ and $q_t^k$. Note that for $x \in X$, G>q implies that G=q+1. Then we have the following lemma.

Lemma 1 When packets are dropped in accordance with $\gamma^*$ (a) $x_{a_i} \in X$, $q_{a_i} < B \rightarrow x_{a_n} \in X$, $G_{a_n} = G_{a_i}$
(b) $x_{o_i} \in X \rightarrow x_{o_n} \in X$, $G_{o_n} = \min\{G_{o_i}+1, B+1\}$
(c) $x_{d_i} \in X \rightarrow x_{d_n} \in X$, $G_{d_n} = G_{d_i} - \min\{1, G_{d_i}\}$
(d) $\max\{\Delta: x_{t+\Delta} \notin X, P_t=1\} \leq \max\{\Delta: \Sigma_{n \in IN} 1\{t < d_n \leq t+\Delta\} = B-1\}$ Proof: (a) Although the arrival causes no overflow ($\rightarrow G_{a_n} = G_{a_i}$), it increases $M(x_{a_i})$ by one when $G_{a_i} = q_{a_i}+1$ because $x_{a_i}(n_{a_i}) = I$, but otherwise leaves $M(x_{a_i})$ unchanged because $x_{a_i}(n_{a_i}) = R$. Since $M(x_{a_i}) = \min\{G_{a_i}, q_{a_i}\}$ for all $x_{a_i} \in X$, when $G_{a_i} = q_{a_i}+1$, $M(x_{a_n}) = M(x_{a_i})+1 = \min\{G_{a_i}, q_{a_i}\}+1 = q_{a_i}+1 = \min\{G_{a_i}, q_{a_i}+1\} = \min\{G_{a_n}, q_{a_n}\}$, and when $G_{a_i} \leq q_{a_i}$, $M(x_{a_n}) = M(x_{a_i}) = \min\{G_{a_i}, q_{a_i}\} = \min\{G_{a_i}+1, G_{a_n}, q_{a_n}\}$. Hence $x \in X$.

(b) Depending on whether $G_{o_i} < B+1$, the packet dropping at position $P_{o_i} = G_{o_i}+1$ will create or enlarge a gap ($\rightarrow G_{o_n} = \min\{G_{o_i}+1, B+1\}$). When $G_{o_i} < B$, the gap creation increases $M(x_{o_i})$ by one because $x_{o_i}(P_{o_i}+1) = R$. When $G_{o_i} = B$, the creation leaves $M(x_{o_i})$ unchanged because $x_{o_i}(P_{o_i}+1) = 0$. Likewise, $M(x_{o_i})$ is unchanged for $G_{o_i} > B$ because $x_{o_i}(P_{o_i}+1) = 0$. Since $M(x_{o_i}) = \min\{G_{o_i}, q_{o_i}\}$ for all $x_{o_i} \in X$, when $G_{o_i} < B$, $M(x_{o_n}) = M(x_{o_i})+1 = \min\{G_{o_i}, q_{o_i}\}+1 = \min\{G_{o_i}, B-1\}+1 = \min\{G_{o_i}+1, B\} = \min\{G_{o_n}, q_{o_n}\}$, when G=B, $M(x_{o_n}) = M(x_{o_i}) = \min\{G_{o_i}\} = \min\{G_{o_i}, B\} = \min\{G_{o_i}+1, B\} = \min\{G_{o_n}, q_{o_n}\}$, and when $G_{o_i} > B$, $M(x_{o_n}) = M(x_{o_i}) = \min\{G_{o_i}, q_{o_i}\} = \min\{G_{o_n}, q_{o_n}\}$. Hence $x \in X$.

(c) Because $x_{d_i} \in X$ and $G_{d_i} < 1$ imply that $x_{d_i}(1) = I$, when $G_{d_i} > 0$ a gap departs with every departing packet ($\rightarrow G_{d_n} = G_{d_i} - \min\{1, G_{d_i}\}$). Because packet departures move all packets forward in the buffer, a gap departure reduces $M(d_n-)$ by one. Since $M(x_{d_i}) = \min\{G_{d_i}, q_{d_i}\}$ for all $x_{d_i} \in X$, when $G_{d_i} > 0$, $M(d_n-) = M(d_n-)-1 = \min\{G_{d_i}, q_{d_i}\}-1 = \min\{G_{d_i}-1, q_{d_i}-1\} = \min\{G_{d_n}, q_{d_n}\}$, and when $G_{d_i} = 0$, $M(d_n-) = M(d_n-) = \min\{G_{d_i}q_{d_i} = \min\{G_{d_i}, q_{d_i}\}\} = \min\{G_{d_n}, q_{d_n}\}$. Hence $x \in X$.

(d) $x_t \notin X$ implies $M(x_t) > \min\{G_t, q_t\}$. $x_t \in X$ implies $M(x_t) = \min\{G_t, q_t\}$. The result follows because: (i) $M(x_t) - \min\{G_t, q_t\} \leq B-1$; (ii) a departure at time s>t decreases $M(x_s) - \min\{G_s, q_s\}$ by one, and (iii) for pointer initialization $P_t=1$, arrivals at time s>t decrease or leave $M(x_s) - \min\{G_s, q_s\}$ unchanged as long as $x_s \notin X$ (because $P_s$ remains less than $M(x_s)$).

Parts (a)–(c) of Lemma 1 ensure that, under $\gamma^*$, once $x_t$ enters X it never leaves. (d) says that when P is initialized to one, the time required to enter X is less than or equal to the time required for B−1 departures to occur. Hence Lemma 1 ensures that in $\gamma^*$'s steady state, $x_t$ belongs to X.

Next we show that once in X, deviating from $\gamma^*$ can not increase, but may decrease, the gap creation rate.

Lemma 2 For all $\gamma \in \Gamma$, and for all realizations of the arrival process $(a_t)_{t \in IR}$, given that $\gamma$ and $\gamma^*$ are in steady state at a common $x_{o_1} \in X$, $$\sum_{n \in IN} Z_{o_n}^{\gamma*} 1\{0 < o_n \leq 1\} \geq \sum_{n \in IN} Z_{o_n}^{\gamma} 1\{0 < o_n \leq 1\}, \qquad (17)$$

with strict inequality for some arrival process.

Proof: Because the times at which arriving packets cause overflows are policy independent, it suffices to prove that, given $x_{o_1} \in X$, $$\sum_{n=1}^{m} Z_{o_n}^{\gamma*} \geq \sum_{n=1}^{m} Z_{o_n}^{\gamma} \text{ for all } m \in IN, \qquad (18)$$

with strict inequality for some arrival process.

We prove this by induction on m. Note, first that since $G_{o_1}^{\gamma*} = G_{o_1}^{\gamma}$ and if $\gamma$ creates a gap at time $o_1 (\rightarrow G_{o_1}^{\gamma} = G_{o_1}+1 \leq B+1)$ then, by Lemma 1 part (b), $\gamma^*$ creates a gap ($\rightarrow G_{o_1}^{\gamma*} = G_{o_1}+1$) and $x_{o_1}^{\gamma*} \in X$. If $\gamma$ enlarges or destroys a gap at time $o_1 (\rightarrow G_{o_1}^{\gamma} \leq G_{o_1})$, then, by Lemma 1 part (b), $\gamma^*$ creates or enlarges a gap ($\rightarrow G_{o_1}^{\gamma*} \geq G_{o_1}$) and $x_{o_1}^{\gamma*} \in X$. Hence, $$Z_{o_1}^{\gamma*} = \max\{0, G_{o_1}^{\gamma*} - G_{o_1}^{\gamma}\} + Z_{o_1}^{\gamma}. \qquad (19)$$

To complete the proof it suffices to show that $$\sum_{n=1}^{m-1} Z_n^{\gamma*} \geq \max\{0, G_{m-1}^{\gamma*} - G_{m-1}^{\gamma}\} + \sum_{n=1}^{m-1} Z_n^{\gamma} \qquad (20)$$

implies $$\sum_{n=1}^{m} Z_n^{\gamma*} \geq \max\{0, G_m^{\gamma*} - G_m^{\gamma}\} + \sum_{n=1}^{m} Z_n^{\gamma}. \qquad (21)$$

Observe first that, during the interval $(o_{m-1}, o_m)$, only packet departures can change $\max\{0, G_t^{\gamma*} - G_t^{\gamma}\}$; arrivals that find an empty or partially filled buffer do not create, enlarge, or destroy, gaps. Using a workload argument analogous to the one in the proof of Theorem 1, it can be shown that single class departure times are policy independent. Hence we can examine the effects of departures, departure-by-departure.

Consider an arbitrary departure $d_l \epsilon(o_{m-1}, o_m)$. By Lemma 1, $x_{d_l}^{\gamma^*} \epsilon X$. Moreover, by Lemma 1 part (c)

$$G_{d_l}^{\gamma^*} = G_{d_l^-}^{\gamma^*} - \min\{1, G_{d_l^-}^{\gamma^*}\}. \tag{22}$$

Since $x_{d_l}^{\gamma}$ need not belong to X, unlike $x_{d_l}^{\gamma^*}$, the first R-packet of $x_{d_l}^{\gamma}$ need not be preceded by a gap, hence $$G_{d_l}^{\gamma} \geq G_{d_l^-}^{\gamma} - \min\{1, G_{d_l^-}^{\gamma}\}. \tag{23}$$

It follows, from (22) and (23) that for all $d_l \epsilon(o_{m-1}, o_m)$, $$\max\{0, G_{d_l}^{\gamma^*} - G_{d_l}^{\gamma}\} = \max\{0, (G_{d_l^-}^{\gamma^*} - \min\{1, G_{d_l^-}^{\gamma^*}\}) - G_{d_l}^{\gamma}\} \tag{24}$$

$$\leq \max\{0, (G_{d_l^-}^{\gamma^*} - \min\{1, G_{d_l^-}^{\gamma^*}\}) - (G_{d_l^-}^{\gamma} - \min\{1, G_{d_l^-}^{\gamma}\})\}$$

$$= \max\{0, G_{d_l^-}^{\gamma^*} - G_{d_l^-}^{\gamma} - (\min\{1, G_{d_l^-}^{\gamma^*}\} - \min\{1, G_{d_l^-}^{\gamma}\})\}$$

When $\min\{1, G_{d_l^-}^{\gamma^*}\} - \min\{1, G_{d_l^-}^{\gamma}\} \geq 0$, $$\max\{0, G_{d_l^-}^{\gamma^*} - G_{d_l^-}^{\gamma} - (\min\{1, G_{d_l^-}^{\gamma^*}\} - \min\{1, G_{d_l^-}^{\gamma}\})\} \leq \max\{0, G_{d_l^-}^{\gamma^*} - G_{d_l^-}^{\gamma}\}. \tag{25}$$

When $\min\{1, G_{d_l^-}^{\gamma^*}\} - \min\{1, G_{d_l^-}^{\gamma}\} < 0$, $G_{d_l^-}^{\gamma^*} = 0$ and $G_{d_l^-}^{\gamma} > 0$, hence (25) still holds.

Applying (25) recursively, at each departure time $d_l < d_{l+1}$, ... in $(o_{m-1}, o_m)$, starting from (20), we obtain the sequence of inequalities $$\sum_{n=1}^{m-1} Z_{o_n}^{\gamma^*} \geq \max\{0, G_{o_{m-1}}^{\gamma^*} - G_{o_{m-1}}^{\gamma}\} + \sum_{n=1}^{m-1} Z_{o_n}^{\gamma}$$

$$\geq \max\{0, G_{o_l}^{\gamma^*} - G_{o_l}^{\gamma}\} + \sum_{n=1}^{m-1} Z_{o_n}^{\gamma}$$

$$\vdots$$

Hence, at time $o_m^-$, we have $$\sum_{n=1}^{m-1} Z_{o_n}^{\gamma^*} \geq \max\{0, G_{o_m^-}^{\gamma^*} - G_{o_m^-}^{\gamma}\} + \sum_{n=1}^{m-1} Z_{o_n}^{\gamma}. \tag{26}$$

Consider next, the effects of the overflow at time $o_m$. From (7) we have $$Z_{o_m}^{\gamma^*} = (G_{o_m}^{\gamma^*} - G_{o_m^-}^{\gamma^*}) - (G_{o_m}^{\gamma} - G_{o_m^-}^{\gamma}) + Z_{o_m}^{\gamma} \tag{27}$$

Adding (27) to (26), rearranging terms, and simplifying, we obtain the relation $$\sum_{n=1}^{m} Z_{o_n}^{\gamma^*} \geq \max\{Z_{o_m}^{\gamma^*} - Z_{o_m}^{\gamma}, G_{o_m}^{\gamma^*} - G_{o_m}^{\gamma}\} + \sum_{n=1}^{m} Z_{o_n}^{\gamma}. \tag{28}$$

When $Z_{o_m}^{\gamma^*} - Z_{o_m}^{\gamma} \geq 0$ $$\max\{0, G_{o_m}^{\gamma^*} - G_{o_m}^{\gamma}\} \leq \max\{Z_{o_m}^{\gamma^*} - Z_{o_m}^{\gamma}, G_{o_m}^{\gamma^*} - G_{o_m}^{\gamma}\}. \tag{29}$$

When $Z_{o_m}^{\gamma^*} - Z_{o_m}^{\gamma} < 0$, $\gamma$ creates a gap but $\gamma^*$ does not. By Lemma 1 part (b), this implies that $G_{o_m}^{\gamma} = B + 1 > G_{o_m}^{\gamma^*}$, hence $G_{o_m}^{\gamma^*} - G_{o_m}^{\gamma} \geq 0$, and thus (29) still holds. Substituting (29) in (28) we obtain (21). The desired inequality follows by induction.

To see that the inequality is strict for some arrival process, suppose that at time $o_1 \gamma$ drops a packet at a buffer position strictly greater than $\gamma^*$'s optimal dropping position $G_{o_1^-} + 1$.

Then, should B+1 overflows occur between the times of $\gamma^*$'s $G_{o_1}+1$th and $G_{o_1}+2$th departures, $\gamma$ loses forever the opportunity to create at least one gap that $\gamma^*$ created.

We can now prove our main result.

Theorem 2 In its steady state, $\gamma^*$ (the packet dropping policy in FIG. 3), is the unique policy in $\Gamma$ minimizing the packet gap in the departure stream for all stationary arrival processes.

Proof: By Theorem 1 it suffices to show that $\gamma^*$ maximizes the gap creation rate in the buffer. By Lemma 2 all policies whose state trajectories pass through X create gaps at a rate that is no greater than $\gamma^*$. Moreover, as noted in the proof of Lemma 2, if at any overflow time, $o_n$, $\gamma$ deviates from $\gamma^*$ then, if the arrival process is such that $\gamma^*$ ever creates B+1 gaps between $\gamma^*$'s $G_{o_T}+1$th and $G_{o_T}+2$th departures, then $\gamma$ is suboptimal. Since all policies must create B+1 gaps in the buffer at some overflow times for some arrival process, and since this buffer state is in X, no policy that deviates from $\gamma^*$ can be optimal for all arrival processes, i.e., since no policy on X but $\gamma^*$ is optimal for all arrival processes, no policy but $\gamma^*$ can be optimal for all arrival processes.

It remains to show that for all arrival processes, $\gamma^*$'s gap creation rate is at least as large as the gap creation rates of those policies whose state trajectories never visit X. In view of the fact that the buffer state corresponding to the creation of B+1 gaps is in X we can argue as follows. If for some arrival process the trajectories of the optimal $\gamma \epsilon \Gamma$ never pass through X, then for that arrival process there is never any need to create more than B gaps. Since overflows that occur when there are less than B+1 gaps in the buffer always create gaps under $\gamma^*$, $\gamma^*$'s gap creation rate for this process is the same as that of $\gamma$. Thus $\gamma^*$ is optimal for all processes and is unique in the sense that all other policies in $\Gamma$ are suboptimal for some process.

Most studies of packet dropping in switching nodes assume that when overflow occurs the arriving packets are dropped (rear dropping). Recently, Yin, et. al. [10] showed that when the packets are instead dropped from the front of the buffer (front dropping), average buffering delay, and the overall loss performance for time constrained traffic, are improved. Because the packet dropping policy we propose for minimizing the average packet gap always drops the packet that creates a new gap closest to the front of the buffer, it minimizes the average buffering delay when this delay can be reduced without increasing the average packet gap. The following theorem extends Yin's result to our case.

Theorem 3 With respect to the average class k buffering delay, at overflow it is always better to drop a class k packet at position i<j than a class k packet at position j. Proof: Let $\alpha, \beta \epsilon \Gamma$ denote any two packet dropping policies such that, when their packet dropping decisions differ, the buffer position of the packet dropped by $\alpha$ is always closer to the front of the buffer than that of the packet dropped by $\beta$. Because this difference does not affect the number of packets that are dropped, the policies' queue length distributions are identical. Consider next, the relationship between the buffering delays of the two policies. For the same arrival process, packets depart at the same times under both policies (although they need not be the same packets). Two packets that depart at the same time are termed a departure pair in [10]. In a departure pair, the policy $\alpha$ packet never arrives earlier than the policy β packet. Hence, for all departure pairs, the waiting time of the policy α packet is always less than or equal to that of the policy β packet. It follows that $$Pr(w_\alpha > x) \leq Pr(w_\beta > x), \quad (30)$$

where $w_\alpha$ and $w_\beta$ denote the buffering delay times under policies α and β. Because under both policies the probability of finding an empty buffer is the same (i.e., $Pr(w_\alpha=0)=Pr(w_\beta=0)$), inequality (30), and the definition of expectation, imply that $$E(w_\alpha) \leq E(w_\beta). \quad (31)$$

This proves the theorem.

Theorem 2 assumes that γ* has reached its steady-state. When this is not the case, there may exist policies that create more gaps than our policy during the time our policy requires to reach steady-state. As shown in Lemma 1 part (d), this time is always short, i.e., less than the time required for B+1 departures. When our policy is in steady state, it performs as well or better than all other policies. In fact, our policy can be applied at any point in a network where the packet gap minimization is needed, e.g., at network entry points or at switching nodes. Moreover, it can be used in conjunction with other flow control methods such as the leaky bucket scheme.

Note that in our analysis, we did not assume any specific input distributions. However, if we know, or can measure, the statistics of the inputs, this information can be used to control the pointer-state. For example, if we know that the probability of the pointer reaching the end of the buffer (i.e., the probability of rear droppings) is very low, then the pointer can jump two or more slots instead of one as we have proposed. This will improve the quality of the recovered signal without increasing the average packet gap much, because when batch arrivals occur the spacing between the gaps will be larger than the policy we proposed.

5. Extensions To Multi-Class Systems And Gap Maximization

The extension of our average packet gap minimization policy to K classes is straightforward. Let $w_t := (w_t(1), \ldots, w_t(B))$ represent the state of the real buffer at time t, where $w_t(i) \in \{1, \ldots, K\}$ denotes the class of the packet in the i-th real buffer position (1=front, B=rear). Let pointer $P^k$ be the pointer that indicates the position in the real buffer where dropping will occur when the next class k packet overflow occurs. Let pointer $m_t$ indicate the position of the last packet of any class in the buffer at time t. Pointer $P^k$ is updated as follows.

1. When at time $a^k$ the first packet of a new class k session arrives, the pointer corresponding to that session $P^k$ is set to $m_{a^k_-}+1$.

2. At each class k packet arrival time $a^k$ that does not cause overflow, $P^k$ is updated as follows.

$$P^k_{a^k} = \begin{cases} B+1, & \text{if } P^k_{a^k_-} = B+2 \\ m_{a^k_-}+1, & \text{if } P^k_{a^k_-} = B+1 \\ P^k_{a^k_-}, & \text{else} \end{cases} \quad (32)$$

3. At subsequent packet departure times d, each pointer $P^i, 1 \leq i \leq K$, is updated as follows.

$$P^i_d = \begin{cases} P^i_{d_-}-1, & \text{if } 1 < P^i_{d_-} < B+1 \\ \min_j \{j : w_d(j) = i, 1 \leq j \leq B\}, & \text{if } P^i_{d_-} = 1, \sum_{j=1}^{B} 1\{w_d(j) = k\} \geq 1 \\ B+1 & \text{if } P^i_{d_-} = 1, \sum_{j=1}^{B} 1\{w_d(j) = i\} = 0 \end{cases} \quad (33)$$

4. At each class k packet overflow time $o^k$, the packet in position $P^k_{o^k_-}$ is dropped and the pointers are updated as follows.
   (a) For each class i pointer, i≠k, set $$P^i_{o^k} = \begin{cases} P^i_{o^k_-}-1, & \text{if } P^k_{o^k_-} < P^i_{o^k_-} < B+1 \\ P^i_{o^k_-}, & \text{else} \end{cases} \quad (34)$$

(b) For class k pointer, set $$P^k_{o^k} = \begin{cases} \min_i \{i : w_{o^k}(i) = k, j \leq i \leq B\}, & \text{if } \sum_{i=P_k}^{B} 1\{w_{o^k}(i) = k\} \geq 2 \\ B+1, & \text{if } \sum_{i=P_k}^{B} 1\{w_{o^k}(i) = k\} \leq 1 \\ B+2, & \text{if } P^k_{o^k_-} = B+1 \end{cases} \quad (35)$$

where $j = \min_i \{1 : W_{o^k}(1) = k, P_{o^k_-}^d \leq 1 \leq B\}$.

Figure 7A:
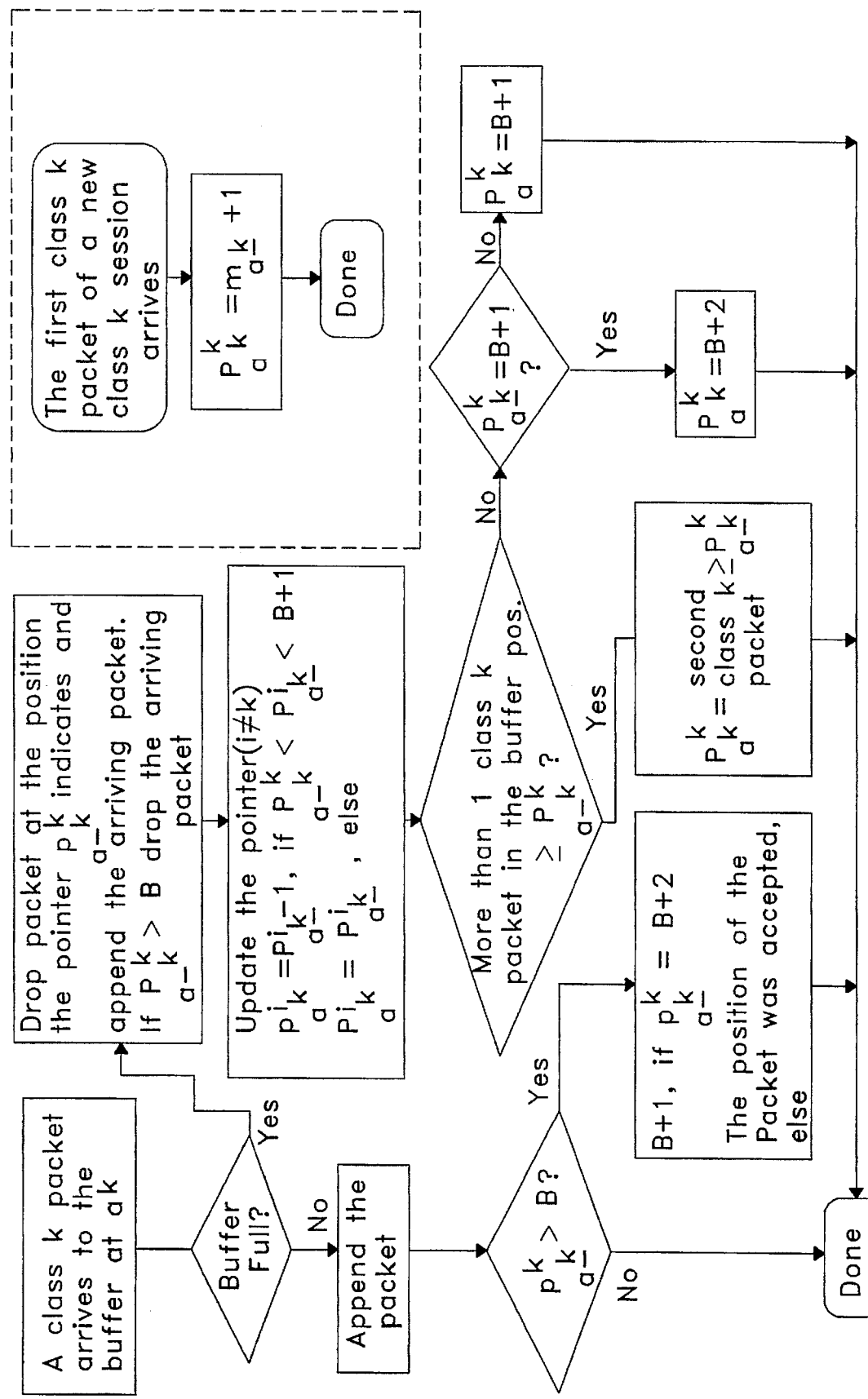
FIGS. 7(a) and 7(b) show flow diagrams corresponding to the state transition rule of FIG. 6 for arrival and departure times, respectively.
Figure 7B:
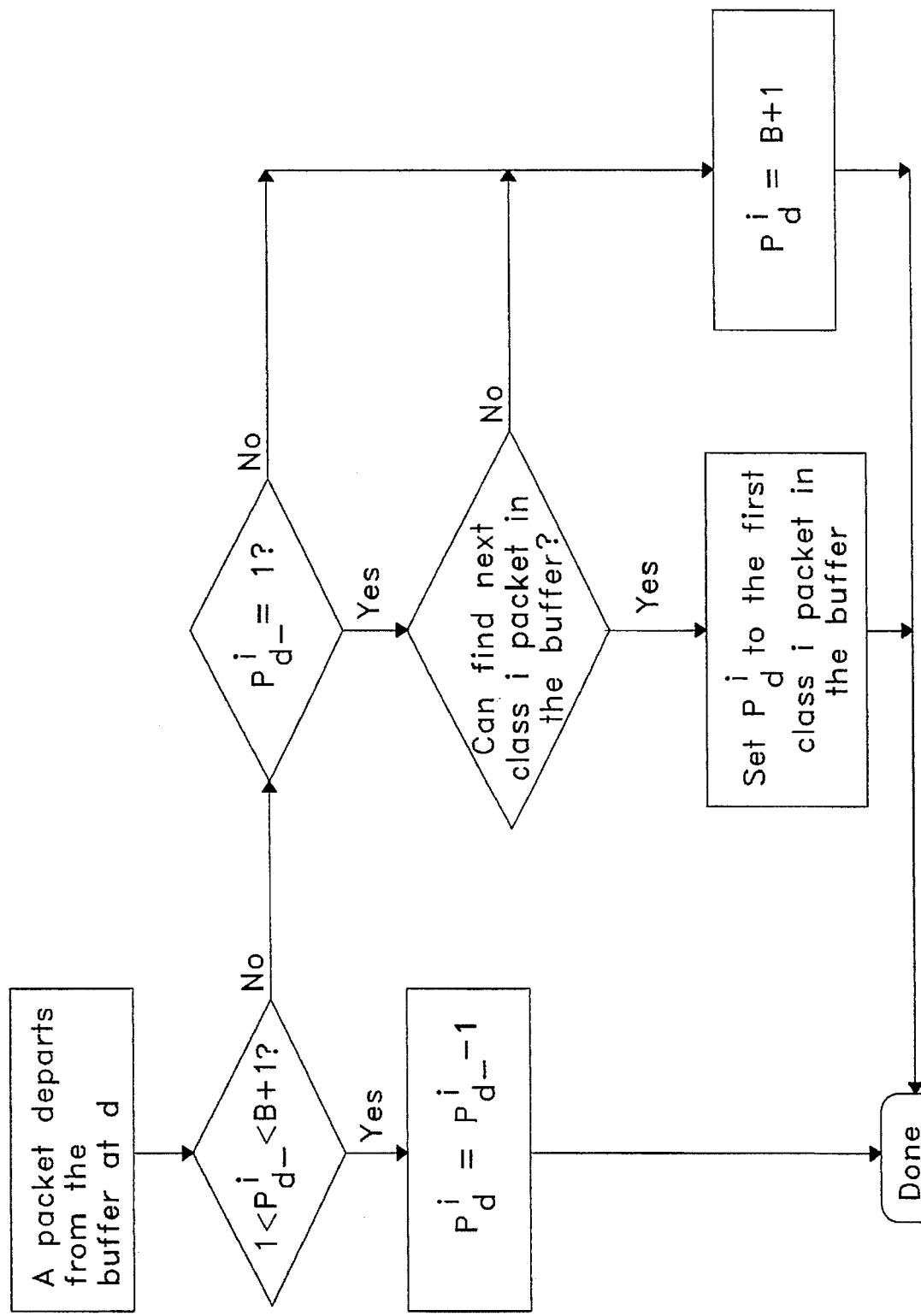

After each class k packet overflow, and some packet departures, the system must search for the next class k packet to drop. Although this necessitates a buffer search, the system does not have to do a position-by-position search—the efficient context memory searches used in existing congestion control systems are sufficient [2]. Our packet dropping policy is especially efficient because there is no need to search for the packet to drop when an overflow occurs. The next packet of each class to be dropped can be determined, with little calculation, prior to the next overflow; the system simply needs to keep track of the pointer-state for each call class that requires the packet gap minimization service. The state transition rule for our multi-class gap minimization policy is shown in FIG. 6. The flow diagrams for the pointer updates at arrival and departure times are shown in FIGS. 7(a) and 7(b).

Figure 8:
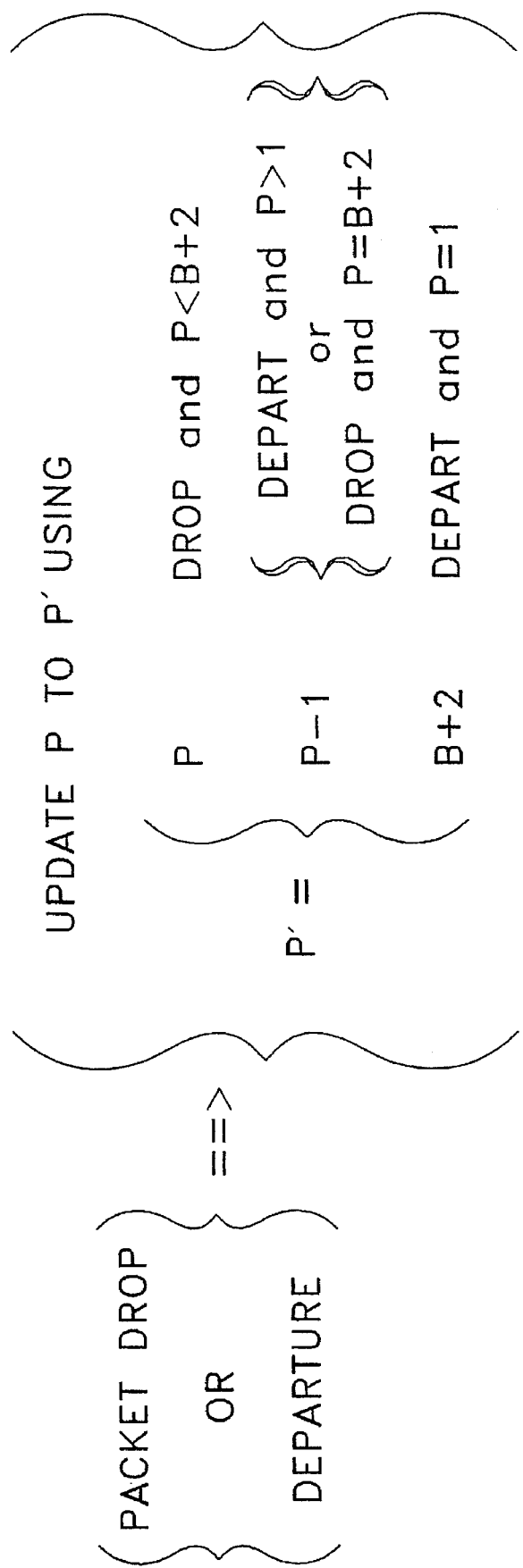
FIG. 8 shows a state transition rule for generating the dropping pointer of the optimal packet dropping policy, according to an embodiment of the invention, to maximize the average packet gap in a single packet class system.
Figure 9:
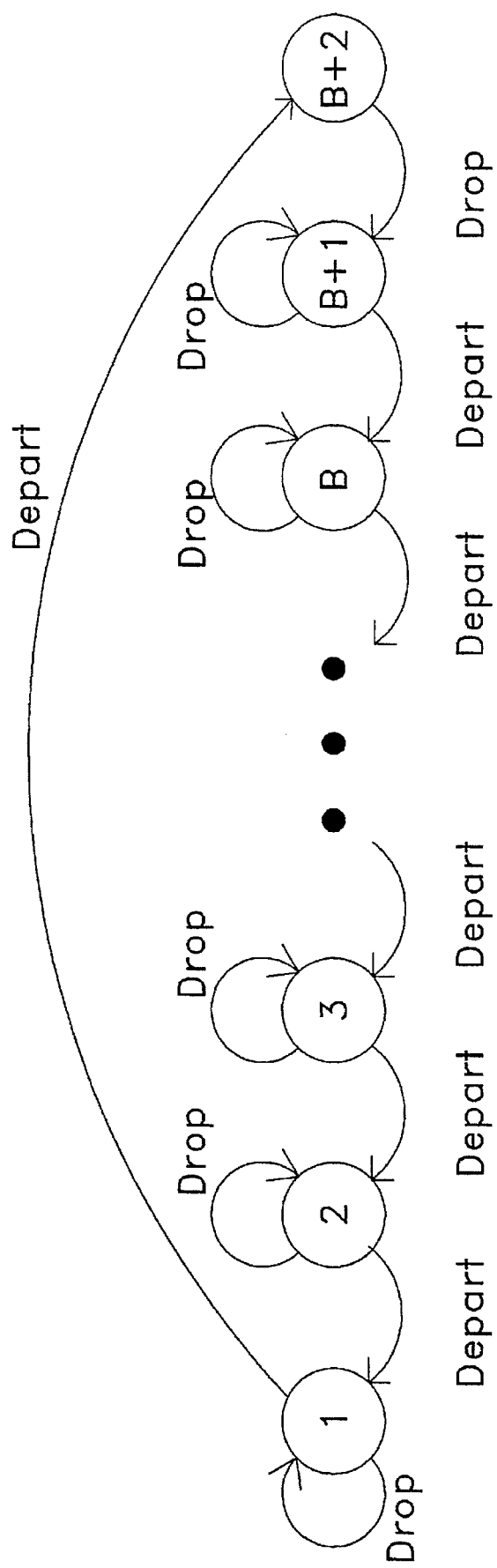
FIG. 9 shows a state transition diagram corresponding to the state transition rule in FIG. 8.
Figure 10:
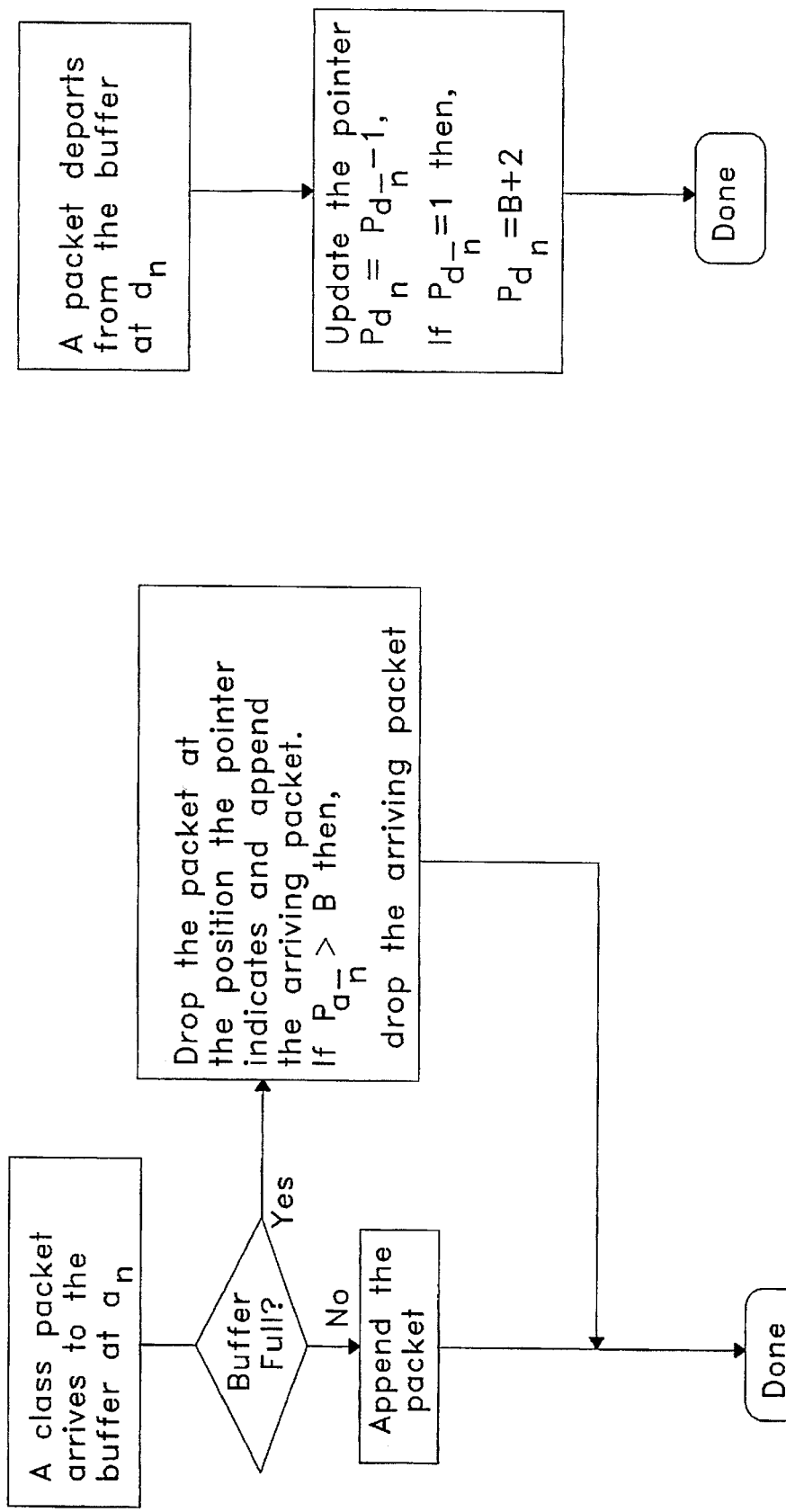
FIG. 10 shows a flow diagram corresponding to the state transition rule of FIG. 8 and the state transition diagram of FIG. 9.

Our basic arguments, circuit, and method are equally applicable to average packet gap maximization. The maximization policy for a single class operates as follows. At the time of an overflow the packet in buffer position P is dropped. After a packet is dropped, or departs, the buffer position pointer is updated. The state transition rule for the update is shown in FIG. 8. The pointer-state transition diagram is shown in FIG. 9. In steady-state the pointer-state indicates the buffer position of the next packet to be dropped should an overflow occur (Positions B+1 and B+2 correspond to rear dropping). The policy maintains the number of gaps at either zero or one, consequently, it is optimal. The pointer-state changes whenever a packet departs, e.g., when the pointer-state is 2, and a packet departs, pointer changes to 1. The pointer-state does not change when an overflow occurs unless the state is B+2, e.g., when the pointer-state is 2 and an arriving packet causes an overflow, the packet in the second real buffer position is dropped and the pointer remains at 2. This single class average gap maximization policy is summarized in flow diagram form in FIG. 10.

The extension of our average packet gap maximization policy to K classes is also straightforward. Once again, let $w_r = (w_r(1), \ldots, w_r(B))$ represent the state of the real buffer at time t, where $w_r(i) \in \{1, \ldots, K\}$ denotes the class of the packet in the i-th real buffer position (1=front,B=rear). Let pointer $P^k$ be the pointer that indicates the position in the real buffer where dropping will occur when the next class k packet overflow occurs. Let pointer $m_t$ indicate the position of the last packet of any class in the buffer at time t.

Pointer $P^k$ is updated as follows.

1. When at time $a^k$ the first packet of a new class k session arrives, the pointer corresponding to that session $P^k$ is set as follows.

$$P_{a^k}^k = \begin{cases} B+1, & \text{if } m_{t^-} = B \\ B+2, & \text{else} \end{cases} \quad (36)$$

2. At each class k packet arrival time $a^k$ that does not cause overflow, $P^k$ is updated as follows.

$$P_{a^k}^k = \begin{cases} m_{a^k_-} + 1, & \text{if } P_{a^k_-}^k = B+1 \\ P_{a^k_-}^k, & \text{else} \end{cases} \quad (37)$$

3. At subsequent packet departure times d, each pointer $P^i$, $1 \leq i \leq K$, is updated as follows.

$$P_d^i = \begin{cases} P_{d^-}^i - 1, & \text{if } 1 < P_{d^-}^i < B+1 \\ B+1, & \text{if } P_{d^-}^i = B+1 \\ B+2, & \text{else} \end{cases} \quad (38)$$

4. At each class k packet overflow time $o^k$, the packet in position $P_{o^k_-}^k$ is dropped and the pointers are updated as follows.

(a) For each class i pointer, i≠k, set $$P_{o^k}^i = \begin{cases} P_{o^k_-}^i - 1, & \text{if } P_{o^k_-}^k < P_{o^k_-}^i < B+1 \\ P_{o^k_-}^i, & \text{else} \end{cases} \quad (39)$$

(b) For class k pointer, set $$P_{o^k}^k = \begin{cases} \min_i \{i : w_{o^k}(i) = k, P_{o^k_-}^k \leq i \leq B\}, & \text{if } P_{o^k_-}^k < B+1 \\ B+1, & \text{else} \end{cases} \quad (40)$$

Figure 12A:
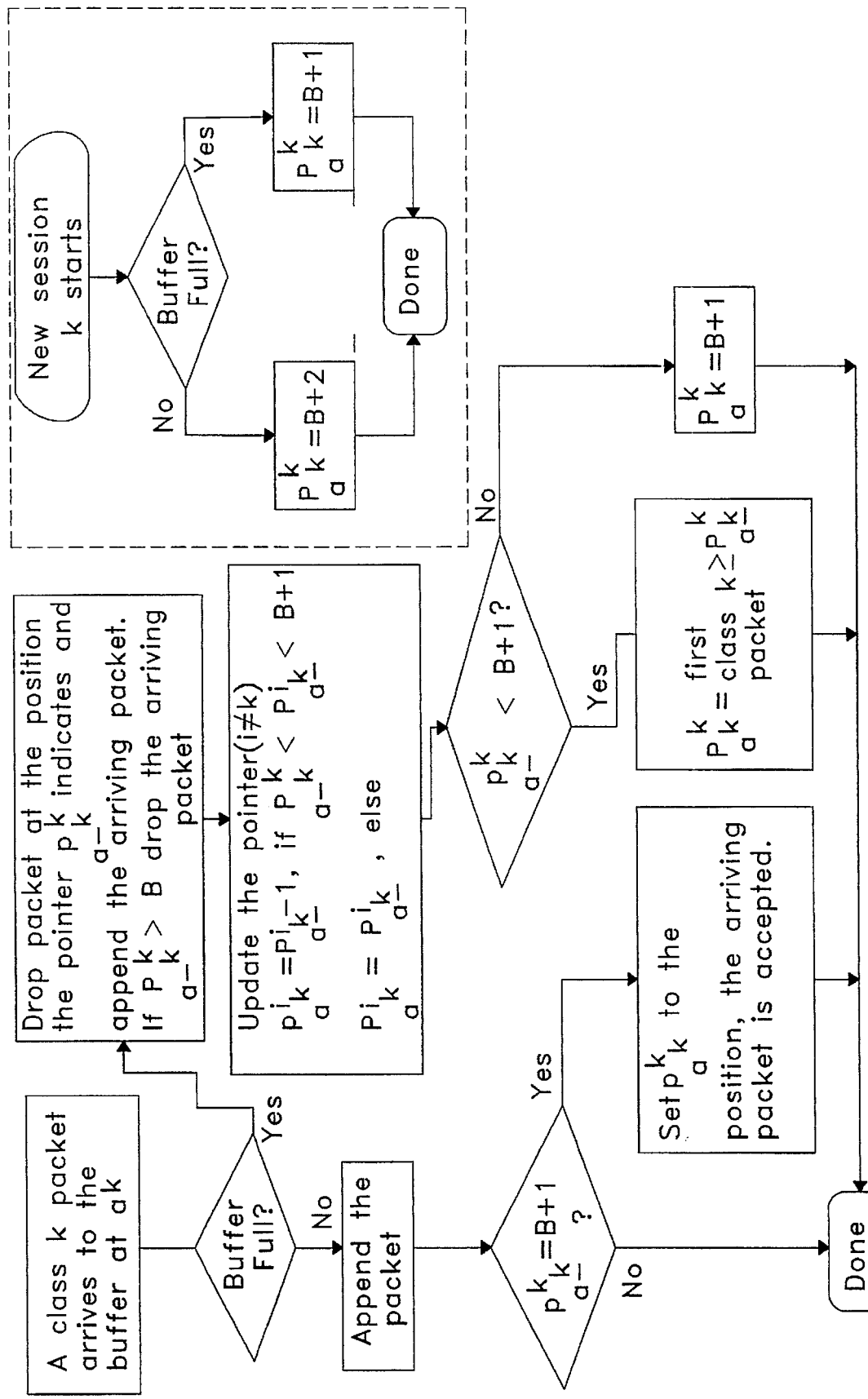
FIGS. 12(a) and 12(b) show flow diagrams corresponding to the state transition rule of FIG. 11 for arrival and departure times, respectively.
Figure 12B:
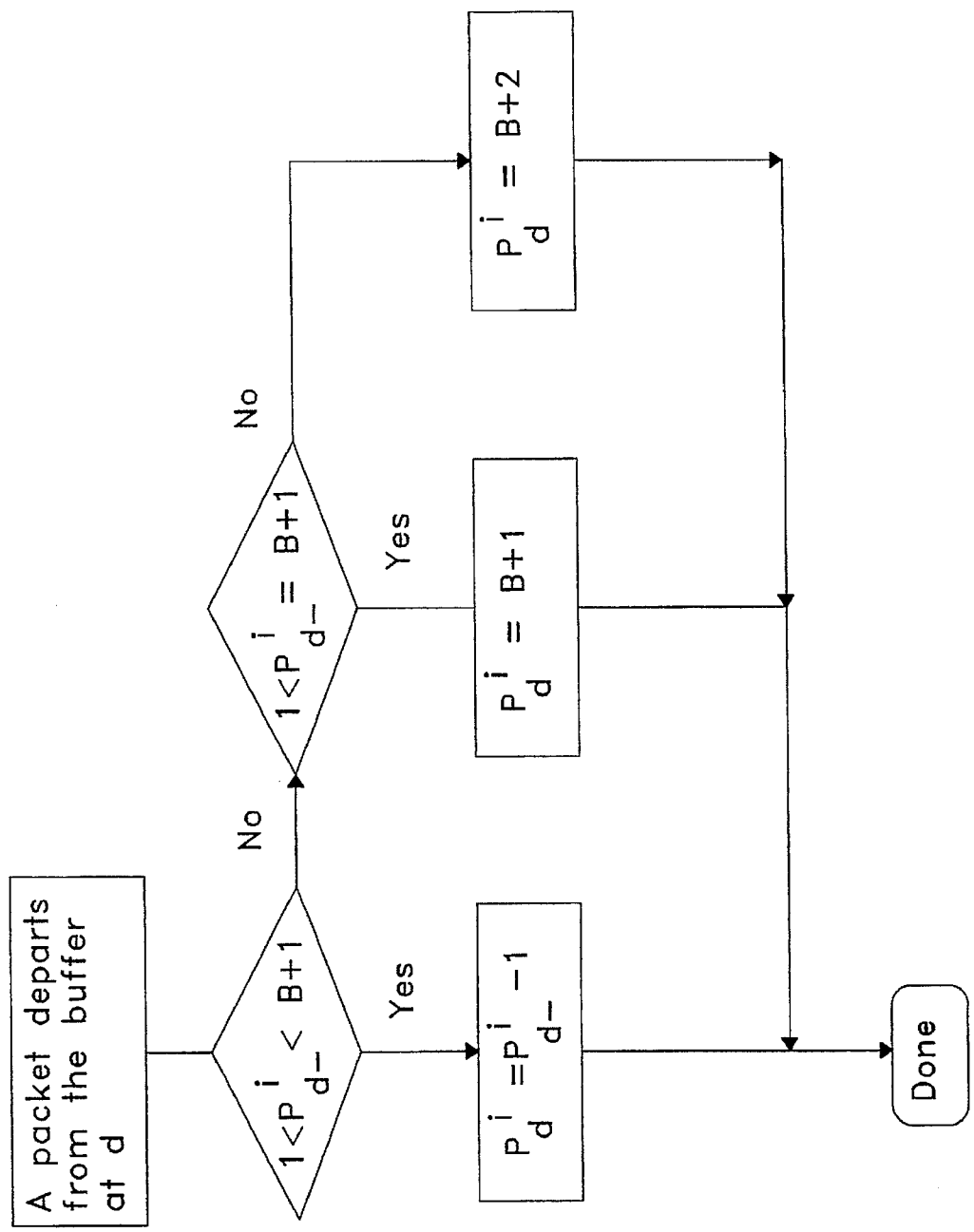

After each class k packet overflow, the system must search for the next class k packet to drop. Although this necessitates a buffer search, the system does not have to do a position-by-position search—the efficient context memory searches used in existing congestion control systems are sufficient [2]. Our packet dropping policy is especially efficient because there is no need to search for the packet to drop when an overflow occurs. The next packet of each class to be dropped can be determined, with little calculation, prior to the next overflow; the system simply needs to keep track of the pointer-state for each call class that requires the packet gap maximization service. The state transition rule for our multi-class gap maximization policy is shown in FIG. 11. The flow diagrams for the pointer updates at arrival and departure times are shown in FIGS. 12(a) and 12(b).

Note that although, for clarity, we have discussed the multi-class packet gap minimization and maximization policies separately, the policies can operate simultaneously. That is, our policies can simultaneously minimize one class's average packet gap while maximizing another's; the pointers are simply updated according to different rules after each overflow and departure. Furthermore, because our policy reaches steady state so quickly, we can dynamically change from gap minimization to gap maximization, and vice versa, as the needs of each class's traffic change.

6. Summary

To establish the optimality of our invention we have modeled consecutive packet loss in the departure streams of packet buffers in a Palm probability framework. The only assumption we made was stationarity. We showed that maximizing the packet gap creation rate in the buffer at the overflow times guarantees the minimum average packet gap in the departure streams at steady-state, and we introduced a simple packet dropping policy accomplishes this. The packet dropping policy we proposed is intuitive and easy to implement, and optimal regardless of the input arrival processes. No other policy is optimal for all inputs. Although we only considered the case of single-class gap minimization in detail we did show that the same basic arguments, circuit, and method are equally applicable to maximizing the average gap length in buffer departure streams, and to minimizing and maximizing the average gap length in multi-class systems.

7. References Cited In The Proof

[1] F. Baccelli and P. Brémaud, *Elements of Queueing Theory*, Springer-Verlag, 1994.

[2] P. E. Boyer, F. M. Guillemin, M. J. Servel, and J. P. Coudreuse, "Spacing cells protects and enhances utilization of ATM links," *IEEE Network*. September 1992, vol. 6, pp. 38–49.

[3] I. Cidon, A. Khamisy and M. Sidi, "Analysis of packet loss processes in high-speed networks," *IEEE Trans. Info. Theory*. January 1993, vol. 39, pp. 98–108.

[4] J. M. Ferrandiz and A. A. Lazar, "Monitoring the packet gap of real-time packet traffic," *Queueing Systems*, vol. 12, 1992, pp. 231–242.

[5] S. Li, "Study of information loss in packet voice systems," *IEEE Trans. Commun.*, vol. 37, 1989, pp. 1192–1202.

[6] D. W. Petr, L. A. DaSilva, and V. S. Frost, "Priority discarding of speech in integrated packet networks," *IEEE J. Select. Areas Commun.*, vol. 7, 1989, pp. 644–656.

[7] D. W. Petr, J. S. Wineinger, "End to end cell discarding analysis for ATM networks," *Proc. IEEE INFOCOM 93*, 1993, pp. 1178–1185.

[8] M. Sidi, W. Liu, I Cidon and I. Gopal, "Congestion control through input rate regulation," *IEEE Trans. Commun.*, March 1993, vol. 41, pp. 471–477.

[9] N. Yin, S. Li and T. Stern, "Performance analysis of a priority-oriented packet voice system," *Proc. IEEE INFOCOM 87*, San Francisco, Calif., 1987, pp. 1054–1062.

[10] N. Yin, M. Hluchyj, "Implication of dropping packets from the front of the queue," *IEEE Trans. Commun.*, vol. 41, 1992, pp. 846–851.

8. IMPLEMENTATION OF THE OPTIMAL PACKET DROPPING POLICY

As discussed in the backgound portion of this application, previous approaches of optimization involved controlling packet loss. They do not, however, control the consecutive packet loss (also called "average packet gap"). In packet switched networks, session performance is often characterized by the packet loss probability. For real time traffic (e.g., voice and video), this measure is not always adequate.

Consider, for example, the relative performance of sessions that lose, respectively, one in every 10 packets, and 10 consecutive packets in every 100. Both sessions exhibit the same packet loss probability, yet intuitively, the larger the consecutive packet loss, the harder it is to reconstruct a packetized voice or video signal without perceptible distortion. In fact, even very small gap lengths in voice packet streams can produce noticeable degradations in voice quality. For this reason, distortion for voice and video systems is reduced by a packet dropping policy that minimizes the average packet gap.

In contrast, traffic that uses retransmission to correct errors, such as certain types of computer data, is improved by a packet dropping policy that maximizes the average packet gap in order to minimize the number of retransmissions.

Regardless of whether the original information is real-time data (e.g. voice and video) requiring a minimum average packet gap, or traffic that uses retransmission to correct errors (e.g. certain types of computer data) requiring a maximum average packet gap, in order to improve session performance, it is necessary to employ a packet dropping policy that controls the consecutive packet loss (average packet gap). As mentioned above, none of the current packet dropping policies are designed to control the consecutive packet loss (average packet gap).

Now that we have proved the optimality of our packet dropping policy, we can implement it in a packet buffer. Packet communications are particularly useful in time-shared systems, since the user is only using system bandwidth when needed. This allows multiple users the opportunity to be simultaneously connected to the same network, since each user only uses system bandwidth when needed. Additionally, because the packet switched system is handling packets rather than directly handling the original information, it is possible to connect a variety of different types of users (e.g. voice, video, and data) to a single packet switched network.

Figure 13:
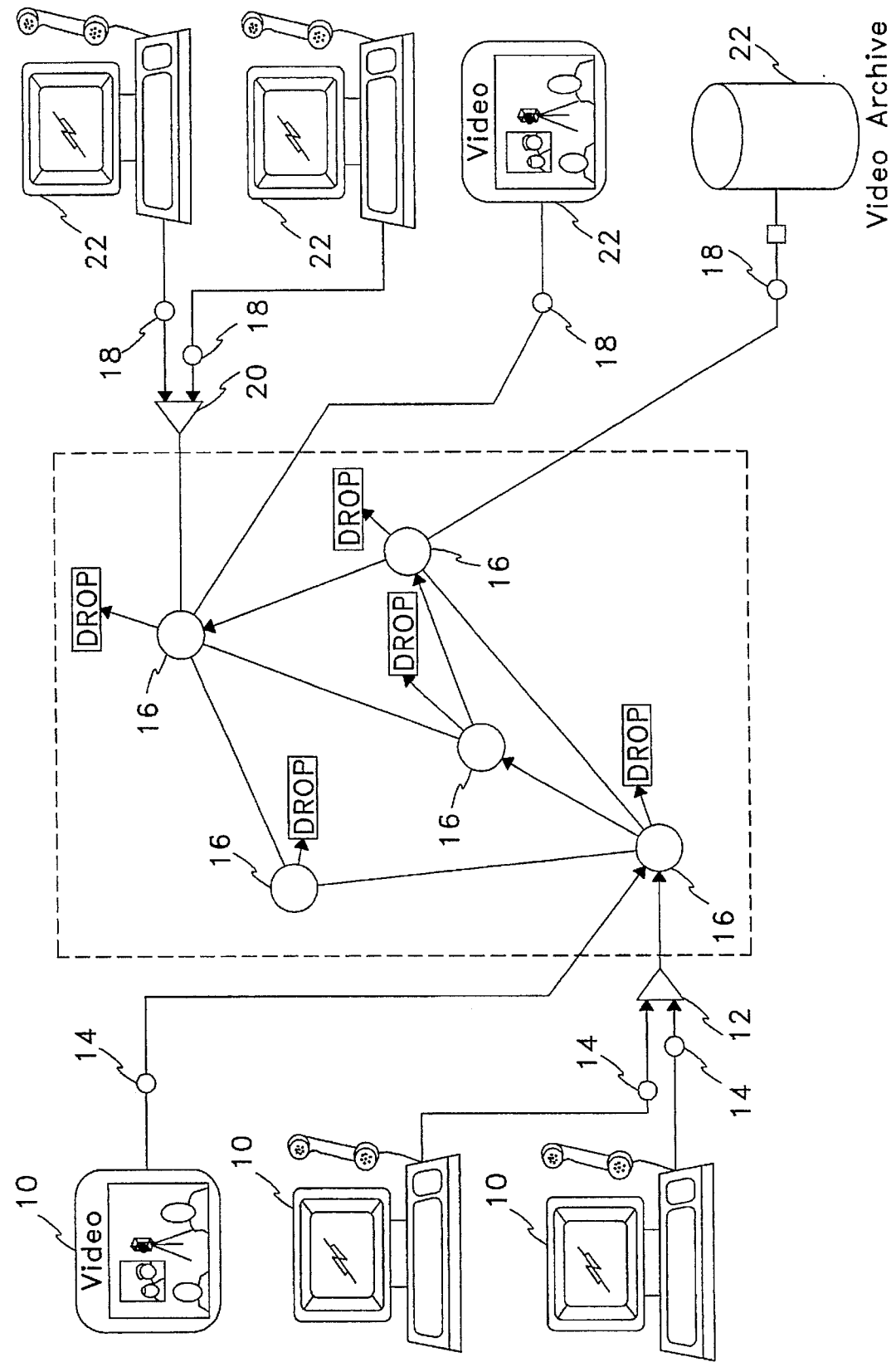
FIG. 13 shows a block diagram of a Typical Packet Switched Network with multiple information sources and destinations.

FIG. 13 shows a block diagram of a typical packet switched network connected to multiple information sources 10, a multiplexer 12, a demultiplexer 20, and multiple information destinations 22. The information sources can be any systems that can transmit and/or receive digital information, such as a computer terminal, etc . . . . Also, since many information sources are bidirectional, they can be treated as both an information source 10 and an information destination 22. The packet switched system includes switching nodes 16 for routing packets.

Additionally, source buffers 14 may exist in the information sources 10 at the transmit end of the network or between the information sources 10 and the input port to the network. Destination buffers 18 may exist in the information destinations 22 at the receive end of the network or between the information destinations 22 and the output port from the network. Since a great deal of user equipment is bidirectional, source buffers 14 and destination buffers 18 may coexist for some information sources 10 and information destinations 22.

Figure 14:
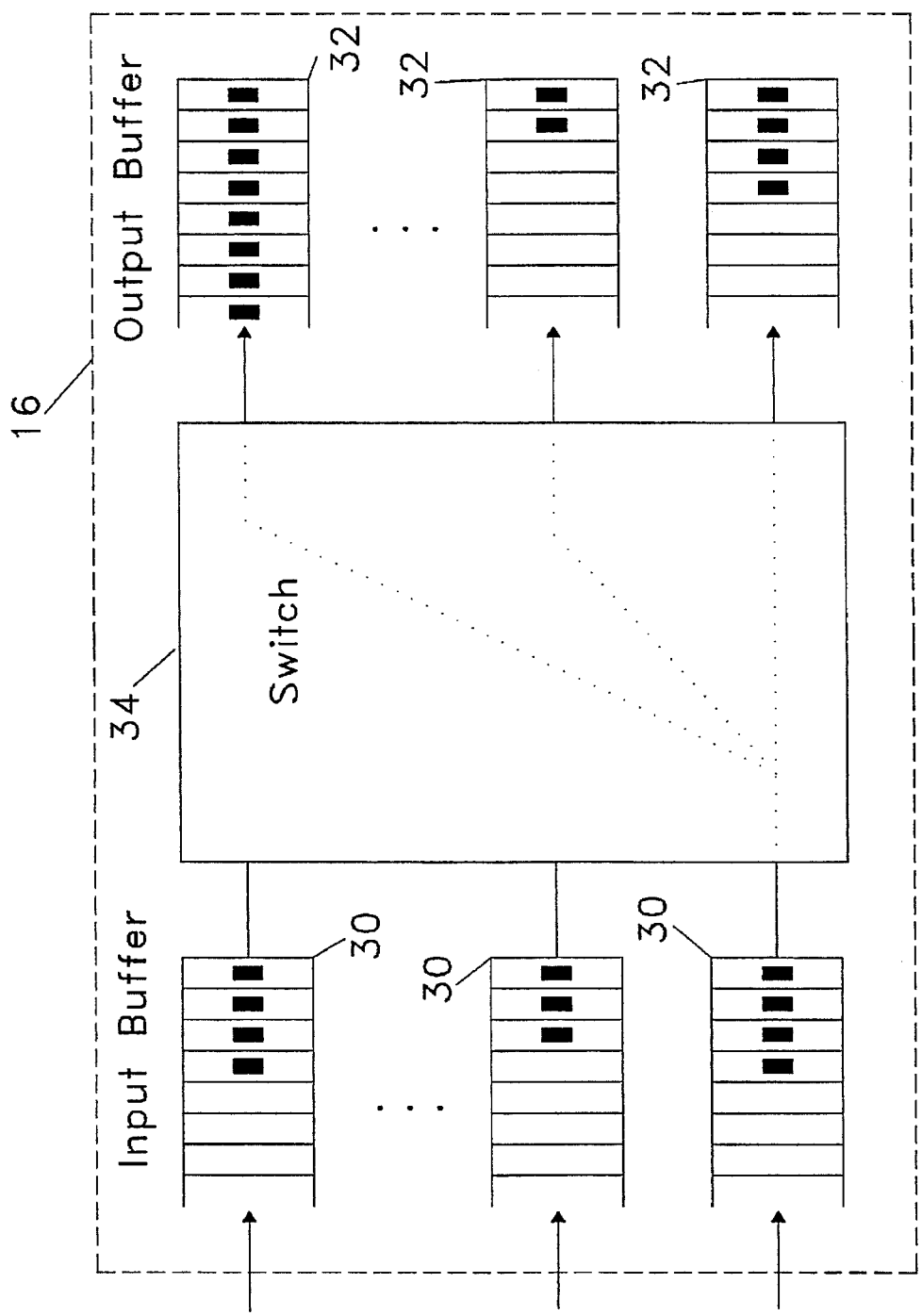
FIG. 14 shows a block diagram of a typical switching node having input and output buffers.

FIG. 14 shows a block diagram of a typical switching node 16 having input buffers 30, output buffers 32, and a switch 34. The input buffers 30 store incoming packets that are waiting for routing. The switch 34 routes packets. The output buffers 32 store packets that have been routed, but are waiting to be sent. The method and circuit, according to the invention, can be used to implement both the input buffers 30 and the output buffers 32, as well as the source buffers 14 and destination buffers 18 from FIG. 13.

There is a limit to the number of packets that the typical switching node 16 can handle at one time. If too many packets are routed through the typical switching node 16 at the same time, congestion can occur and the associated input buffer 30 or output buffer 32 may become full and be unable to store incoming packets. When this buffer reaches an overflow state, it is necessary for the buffer to drop packets.

Figure 15A:
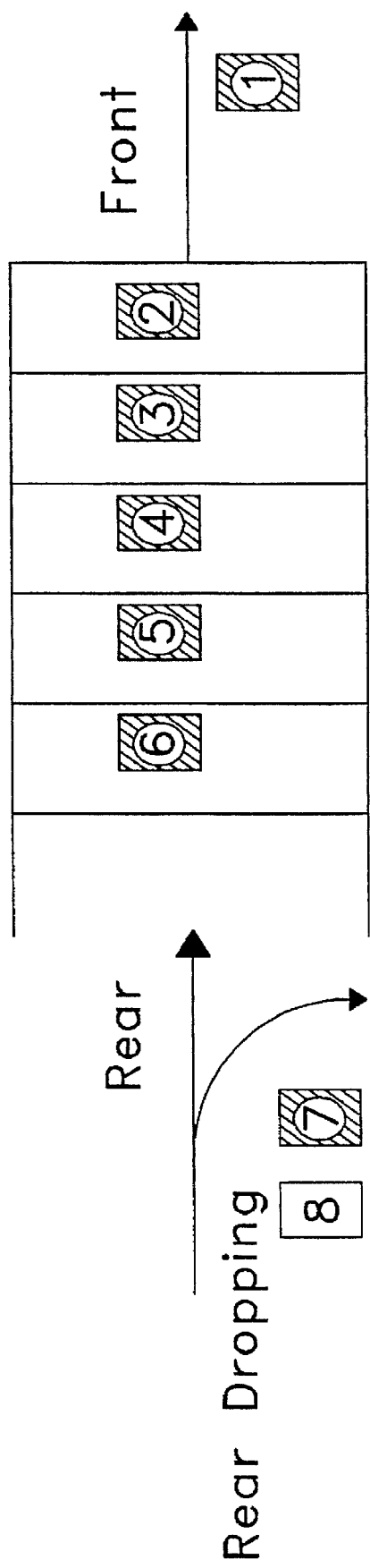
FIGS. 15 (a), (b), and (c) show packet dropping policies for rear dropping, front dropping, and priority dropping, respectively.
Figure 15B:
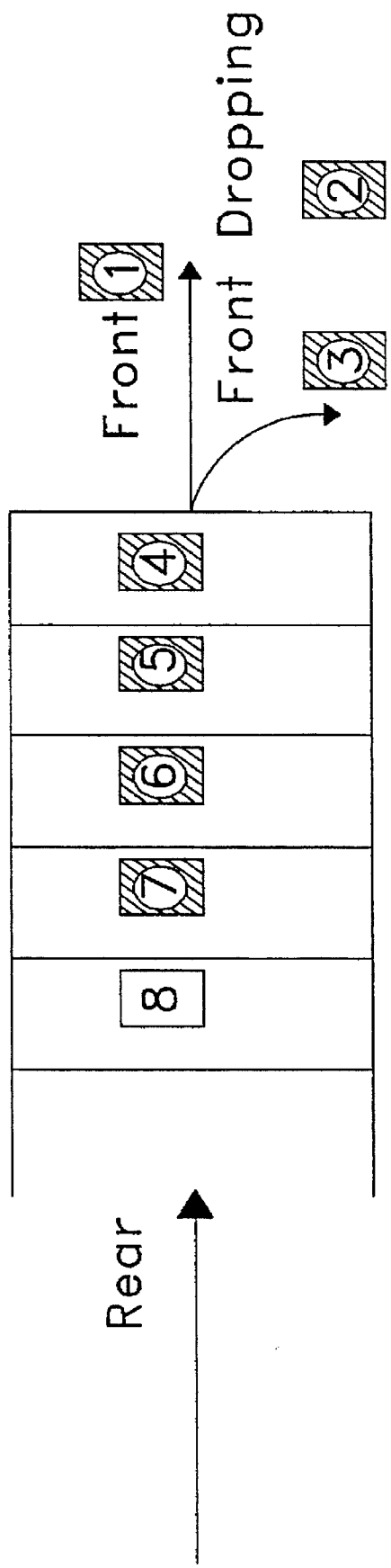

Several different policies for packet dropping have been tried. FIG. 15(a) shows a Rear Dropping policy in which packets are dropped from the rear of the buffer until the buffer is no longer full. FIG. 15(b) shows a Front Dropping policy, suggested by Yin et al. in "Implication of dropping packets from the front of the queue," IEEE Trans. Commun., vol. 41, 1992, pp. 846–51, in which packets are dropped from the front of the buffer. Yin et al. shows that a policy of front dropping improves both average buffering delay and the overall loss performance for time constrained traffic.

Figure 15C:
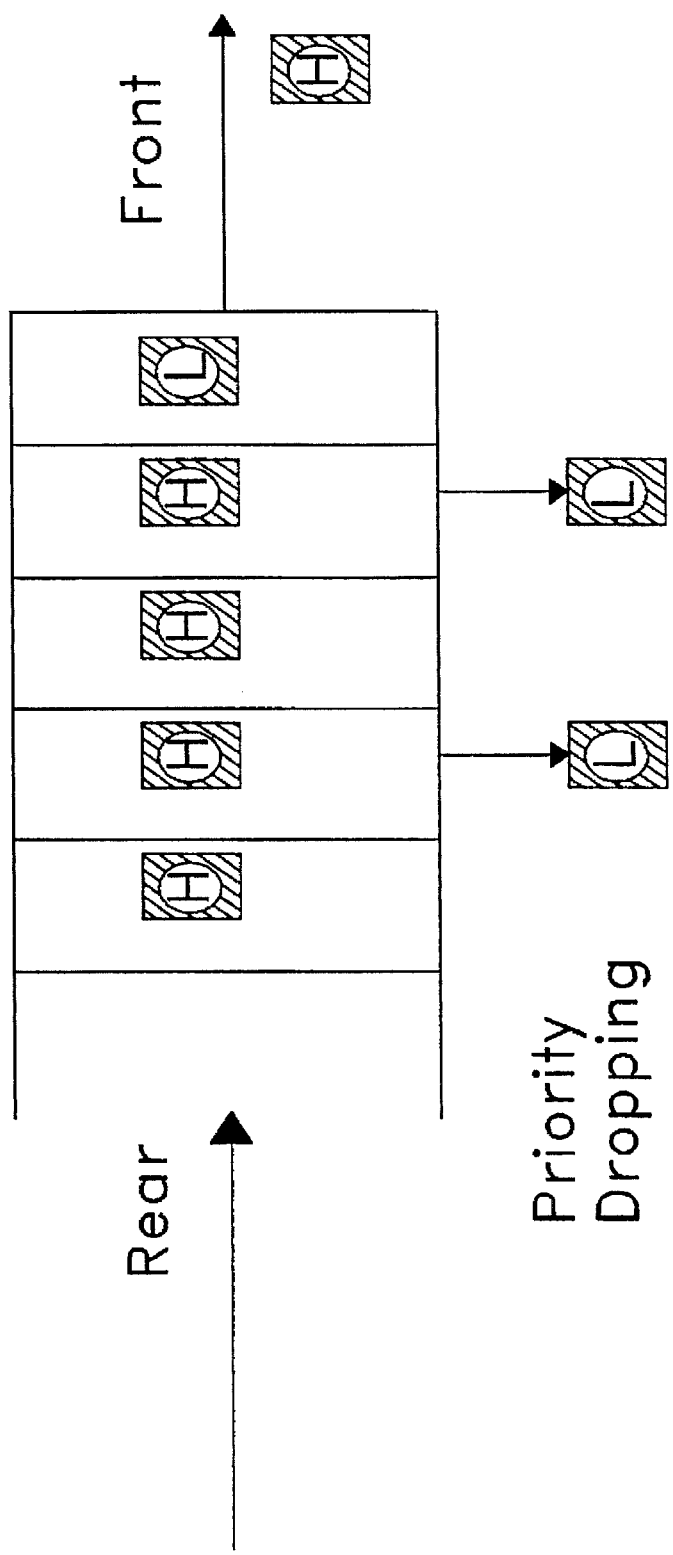

FIG. 15(c) shows a Priority Dropping policy, one of which is disclosed in U.S. Pat. No. 4,769,810 and 4,769,811, in which incoming packets are marked with a priority marker (establishing classes of packets) and in which low priority packets are dropped. Although this policy decreases the probability of dropping high priority packets, it accomplishes this result at the expense of increasing the probability of dropping low priority packets.

The problem with all of these approaches is that they do not control the consecutive packet loss (also called "average packet gap"). In packet switched networks, session performance is often characterized by the packet loss probability. For real time traffic (e.g., voice and video) and for traffic that uses retransmission to correct errors (e.g. certain types of computer data), this measure is not always adequate since it does not measure the average packet gap.

Even very small packet gap lengths in voice packet streams can produce noticeable degradations in voice quality. For this reason, distortion for voice and video systems is reduced by a packet dropping policy that minimizes the average packet gap.

In contrast, traffic that uses retransmission to correct errors, such as certain types of computer data, is improved by a packet dropping policy that maximizes the average packet gap in order to minimize the number of retransmissions.

Regardless of whether the original information is real-time data (e.g. voice and video) requiring a minimum average packet gap, or traffic that uses retransmission to correct errors (e.g. certain types of computer data) requiring a maximum average packet gap, in order to improve session performance, it is necessary to employ a packet dropping policy that controls the average packet gap. As mentioned above, none of the current packet dropping policies are designed to control the average packet gap. As shown above in our proof, our packet dropping policy is optimal for controlling average packet gap size and can be implemented using the state transition rules shown in FIGS. 3, 6, 8, and 11. Also since our packet dropping policy starts the gap as close as possible to the front of the buffer for the case of minimizing the average packet gap, the policy also minimizes the average packet buffering delay.

Figure 16:
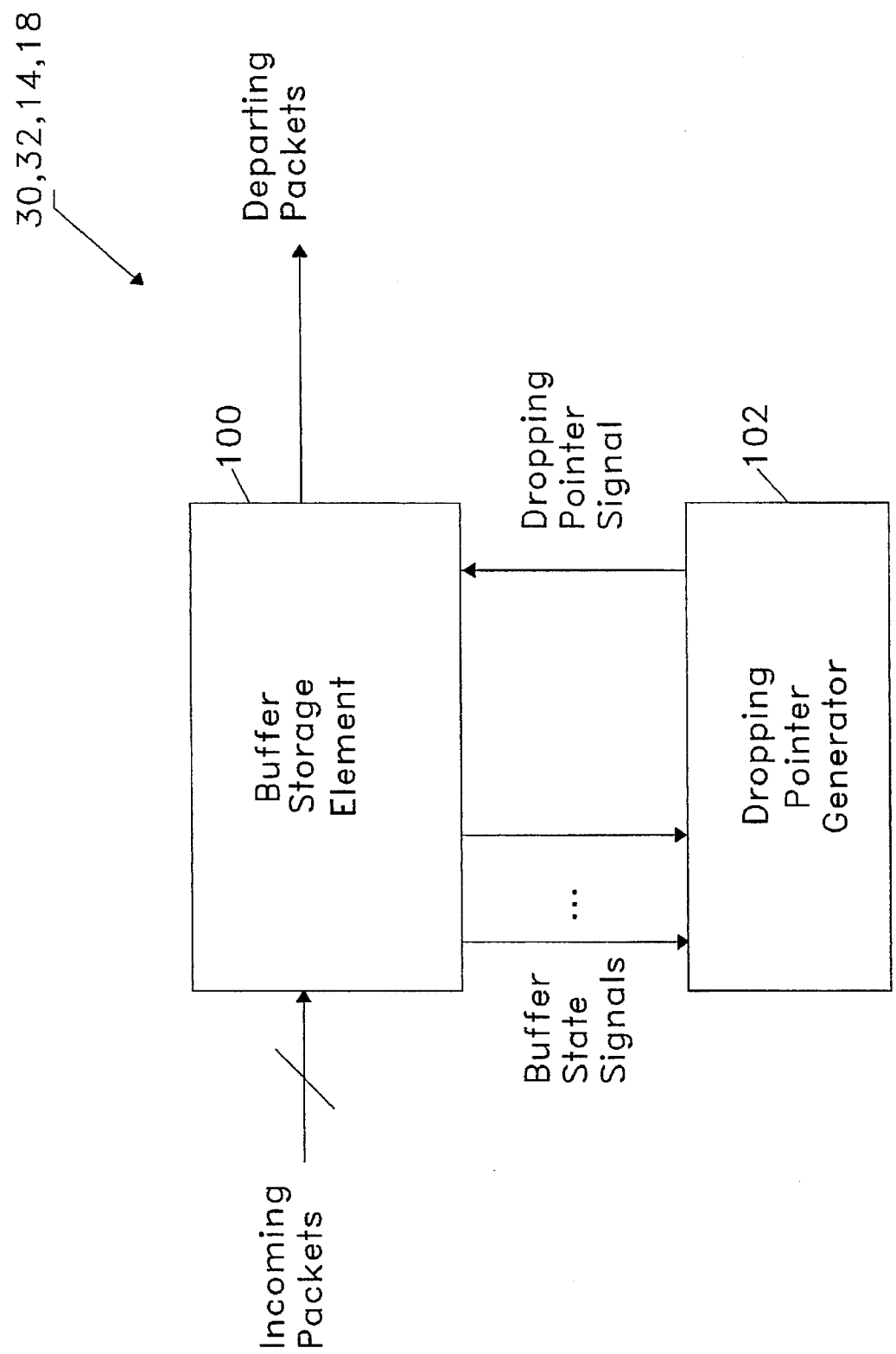
FIG. 16 shows a circuit, according to an embodiment of the invention, for implementing the optimal packet dropping policy in a single packet class system.

FIG. 16 shows a buffer (which can be any one of previously discussed elements 14, 18, 30 and 32), according to 5 an embodiment of the invention, for implementing the optimal packet dropping policy in a single packet class system. The buffer includes a buffer storage element 100 and a dropping pointer generator 102. The buffer storage element 100 receives incoming packets, transmits outgoing packets, produces necessary buffer state signals to indicate the current state of the buffer, and receives a dropping pointer signal to indicate which packet to drop when the buffer overflows. The buffer storage element 100 is well known to those skilled in the art and may be built from a conventional memory with an embedded system of pointers. Such memory devices are currently used in packet switched systems as packet buffers and are available from a large number of sources, as discussed in Electronic Design, "ATM Silicon: Ready for Takeoff", Apr. 4, 1994 pp. 51–65, the contents of which are incorporated herein by reference.

The dropping pointer generator 102 receives at least one buffer state signal from the buffer storage element 100 to indicate an overflow condition and produces a dropping pointer signal that is sent to the buffer storage element 100 to indicate which packet to drop when the buffer reaches an overflow state. The dropping pointer generator 102 is a circuit that implements the appropriate state transition rule for the particular traffic. If the traffic is real-time data (e.g. voice and video) then the minimum average packet gap state transition rule is used (FIG. 3), and if the traffic uses retransmission to correct errors (e.g. certain types of computer data) then the maximum average packet gap state transition rule is used (FIG. 8).

In the dropping pointer generator 102, the appropriate state transition rule can be implemented in a variety of ways. Since most of the transitions involve either incrementing or decrementing a state counter, the packet dropping policy can easily be implemented using combinatorial logic. The state transition rule can also be implemented in a state machine using, e.g. Programmable Array Logic (PAL), a Gate Array, a Standard Cell, or a Field Programmable Gate Array (FPGA). The state transition rule can additionally be implemented using software in a microprocessor. Alternately, the software for implementing the state transition rule can be incorporated into the software of the packet switching system containing the packet buffer.

Figure 17:
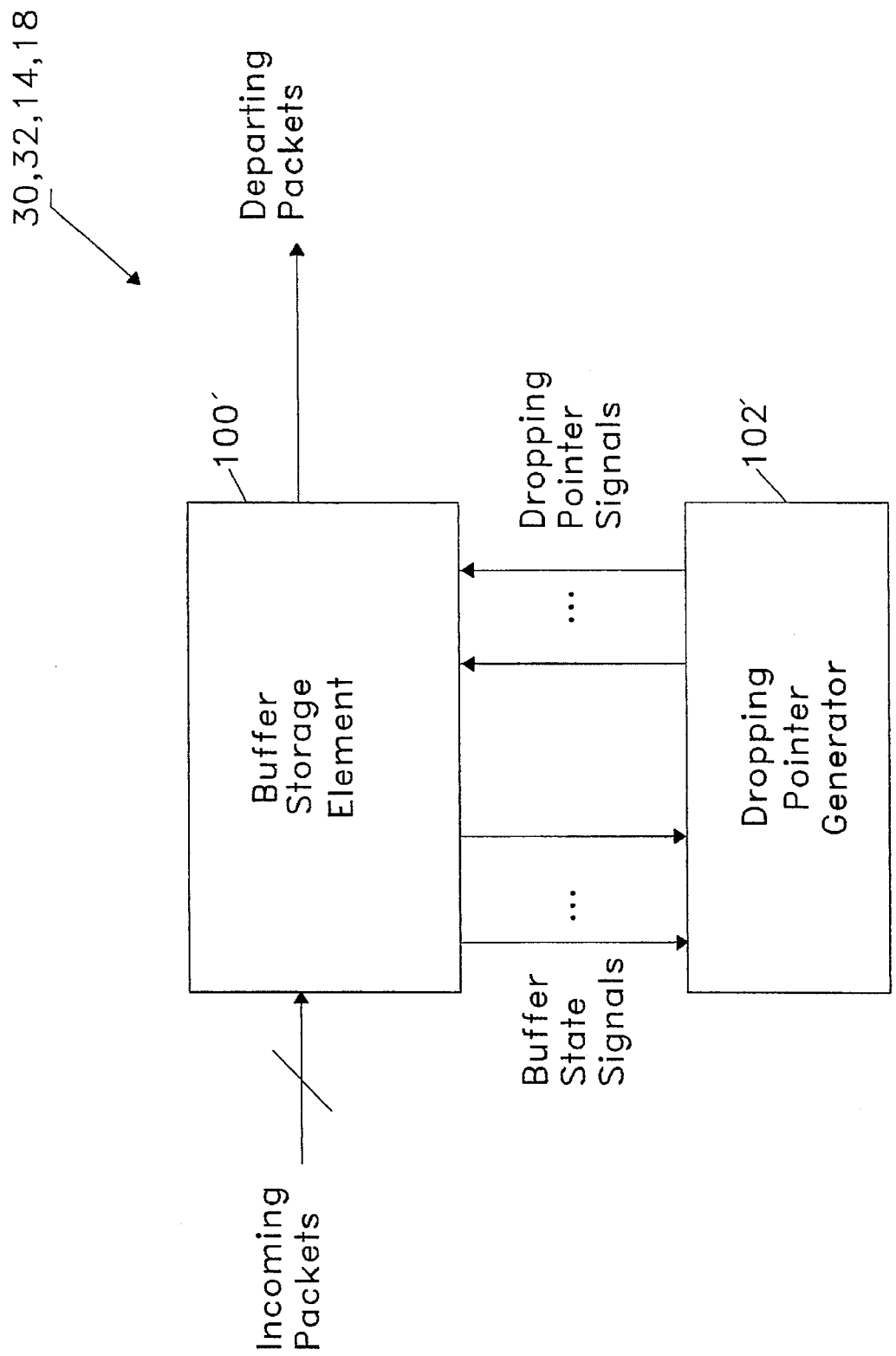
FIG. 17 shows a circuit, according to an embodiment of the invention, for implementing the optimal packet dropping policy in a multiple packet class system.

FIG. 17 shows a buffer (which can be any one of previously discussed elements 14, 18, 30 and 32), according to an embodiment of the invention, for implementing the optimal packet dropping policy in a multiple packet class system. The buffer is very similar to the buffer described above for the single packet class system, except for separate dropping pointer signals for each of the packet classes. The buffer includes a buffer storage element 100' and a dropping pointer generator 102'. The buffer storage element 100' receives incoming packets, transmits outgoing packets, produces necessary buffer state signals to indicate the current state of the buffer, and receives a dropping pointer signal for each class to indicate which packet to drop when the buffer overflows. The dropped packet will be of a class corresponding to the class of the incoming packet at the time that the buffer has reached an overflow condition. The buffer storage element 100' is well known to those skilled in the art and may be built from a conventional memory with an embedded system of pointers. Such memory devices are currently used in packet switched networks as packet buffers, e.g. Electronic Design, "ATM Silicon: Ready for Takeoff", Apr. 4, 1994 pp. 51–65, the contents of which are incorporated herein by reference.

The dropping pointer generator 102' receives at least one buffer state signal from the buffer storage element 100' to indicate an overflow condition and produces dropping pointer signals for each class that are sent to the buffer storage element 100' to indicate which packet to drop when the buffer reaches an overflow state. The dropping pointer generator 102' is a circuit that implements the appropriate state transition rule for the particular traffic, for each class. If the traffic is real-time data (e.g. voice and video) then the minimum average packet gap state transition rule is used (FIG. 6), and if the traffic uses retransmission to correct errors (e.g. certain types of computer data) then the maximum average packet gap state transition rule is used (FIG. 11).

In the dropping pointer generator 102', the appropriate state transition rule for each class can be implemented in a variety of ways. Since most of the transitions involve either incrementing or decrementing a state counter, the packet dropping policy can be implemented using combinatorial logic. The state transition rule can also be implemented in a state machine using, e.g. Programmable Array Logic (PAL), a Gate Array, a Standard Cell, or a Field Programmable Gate Array (FPGA). The state transition rule can additionally be implemented using software in a microprocessor. Alternately, the software for implementing the state transition rule can be incorporated into the software of the packet switching system containing the packet buffer.

The packet dropping policy, according to the invention, is generally applicable beyond the field of packet dropping in a packet buffer. Since our proof only assumes stationarity of the packet arrival process and that the system has reached steady-state, it is applicable to the control of gap size between customers in any service system having a finite buffer, e.g. computing systems and scheduling of repair time maintenance, or any situations where the job process/customer can be removed from the buffer and rescheduled for a later time. Although the circuits in FIGS. 16 and 17 are labeled with regard to a packet buffer, they obviously can be extended to these other applications.

Obviously numerous and additional modifications and variations of the present invention are possible in light of the above teachings. It is therefore to be understood that, within the scope of the appended claims, the invention may be practiced otherwise than as specifically disclosed and claimed herein.

What is claimed:

1. A method for producing a desired average packet gap size in a packet buffer, comprising the steps of:
   receiving incoming packets at said packet buffer;
   transmitting outgoing packets from said packet buffer;
   selecting a state transition rule based on the desired average packet gap size; and
   dropping packets from said packet buffer according to said state transition rule, when said buffer reaches overflow, to produce said average packet gap size.

2. The method as claimed in claim 1, wherein said selecting step comprises selecting the state transition rule so as to minimize average packet gap size.

3. The method as claimed in claim 1, wherein said selecting step comprises selecting the state transition rule so as to minimize said average packet gap size.

4. The method as claimed in claim 1, wherein said packets are at least of one class.

5. The method as claimed in claim 4, wherein the next packet of each of said at least one class of packets to be dropped is determined prior to the next overflow.

6. The method as claimed in claim 1, wherein the next packet to be dropped can be determined prior to each overflow using said state transition rule.

7. The method as claimed in claim 1, wherein said method is independent of packet arrival statistics, buffer size, and buffer location.

8. The method as claimed in claim 1, wherein said system reaches steady-state within the time required for servicing one complete buffer of packets.

9. The method as claimed in claim 1, wherein said dropping step occurs with a packet dropping policy that creates the gap as close as possible to the front of the buffer.

10. The method as claimed in claim 1, wherein said packets have deterministic service requirements.

11. A method for producing a desired average gap size between customer processes in a finite buffer of a service system, comprising the steps of:

receiving incoming customer processes at said service system;

releasing outgoing customer processes from said service system;

selecting a state transition rule based on the desired average gap size; and creating gaps in said finite buffer according to said state transition rule, when said finite buffer reaches overflow, to produce said desired average gap size between customer processes.

12. A packet buffer circuit for producing a desired consecutive packet loss, comprising:

a buffer storage means for receiving incoming packets and transmitting departing packets, said buffer storage means generating at least one buffer state signal to indicate an overflow condition and receiving a dropping pointer signal to indicate the location of a packet to be dropped; and a dropping pointer generator, connected to said buffer storage means, for receiving said at least one buffer state signal and for generating, in response to said at least one buffer state signal, a dropping pointer signal, according to a state transition rule selected to produce said desired consecutive packet loss.

13. A packet switched system having an interconnected plurality of nodes, wherein at least one of said plurality of nodes includes a buffer circuit for producing a desired consecutive packet loss, wherein said buffer circuit includes:

a buffer storage means for receiving incoming packets and transmitting departing packets, said buffer storage means generating at least one buffer state signal to indicate an overflow condition and receiving a dropping pointer signal to indicate the location of a packet to be dropped; and a dropping pointer generator, connected to said buffer storage means, for receiving said at least one buffer state signal and for generating, in response to said at least one buffer state signal, a dropping pointer signal, according to a state transition rule selected to produce said desired consecutive packet loss.

14. A method for producing a desired average packet gap size in a packet buffer, comprising the steps of:

receiving an arriving packet at said packet buffer;

dropping a packet at a predetermined position at any location within said packet buffer, said predetermined position indicated by a pointer in said packet buffer at the time of an overflow; and appending said arriving packet in said packet buffer.

15. The method as claimed in claim 14, further comprising the step of updating said pointer after said dropping step.

16. A method for producing a desired average packet gap size in a packet buffer, wherein the desired average packet gap size is determined by the type of information in the packet buffer, comprising the steps of:

receiving an arriving packet at said packet buffer; and dropping one of said arriving packet and a packet at a predetermined position in said packet buffer indicated by a pointer at the time of an overflow, wherein said predetermined position can be any position within said packet buffer and is determined by the desired average packet gap size.

17. A method for directly controlling average packet gap size in a packet buffer in a system carrying multiple classes of packets, comprising the steps of:

receiving incoming packets of said multiple classes of packets at said packet buffer;

transmitting outgoing packets of said multiple classes of packets from said packet buffer; and dropping packets of said multiple classes of packets from said packet buffer according to class-specific state transition rules, when said packet buffer reaches overflow, to minimize average packet gap size of at least one of said multiple classes of packets and to maximize average packet gap size of at least one other of said multiple classes of packets for each overflow.

18. The method as claimed in claim 17, wherein the minimization of average packet gap size of said at least one of said multiple classes of packets and the maximization of average packet gap size of said at least one other of said multiple classes of packets occur simultaneously.

19. The method as claimed in claim 17, wherein the minimization of average packet gap size of said at least one of said multiple classes of packets and the maximization of average packet gap size of said at least one other of said multiple classes of packets can be dynamically changed from minimization to maximization, and vice versa, as the needs of each of said at least one of said multiple classes of packets and said one other of said multiple classes of packets traffic change.

* * * * *